US012764016B2

(12) United States Patent
Chen Larsson et al.

(10) Patent No.: US 12,764,016 B2
(45) Date of Patent: Oct. 13, 2026

(54) ML MODEL SUPPORT AND MODEL ID HANDLING BY UE AND NETWORK

(71) Applicant: TELEFONAKTIEBOLAGET LM ERICSSON (PUBL), Stockholm (SE)

(72) Inventors: Daniel Chen Larsson, Lund (SE); Lars Lindbom, Stockholm (SE); Andres Reial, Lund (SE); Icaro Leonardo Da Silva, Stockholm (SE); Yufei Blankenship, Kildeer, IL (US); Henrik Rydén, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/860,601

(22) PCT Filed: Apr. 25, 2023

(86) PCT No.: PCT/IB2023/054262
§ 371 (c)(1),
(2) Date: Oct. 25, 2024

(87) PCT Pub. No.: WO2023/209577
PCT Pub. Date: Nov. 2, 2023

(65) Prior Publication Data

US 2025/0330373 A1 Oct. 23, 2025

Related U.S. Application Data

(60) Provisional application No. 63/334,603, filed on Apr. 25, 2022.

(51) Int. Cl.
*H04L 41/0803* (2022.01)
*G06N 20/00* (2019.01)
*H04W 76/27* (2018.01)

(52) U.S. Cl.
CPC ......... *H04L 41/0803* (2013.01); *H04W 76/27* (2018.02)

(58) Field of Classification Search
CPC .... H04L 41/0803; H04W 76/27; G06N 20/00
See application file for complete search history.

(56) References Cited

U.S. PATENT DOCUMENTS 11,954,126 B2 * 4/2024 Srinivasan ............ G06F 16/254
12,541,705 B2 * 2/2026 Patil ....................... G06N 20/00

(Continued)

FOREIGN PATENT DOCUMENTS

WO 2022013104 A1 1/2022
WO WO-2022077202 A1 * 4/2022 ............. H04L 51/18

OTHER PUBLICATIONS

Kingma et al., "Adam: A method for stochastic optimization," published as a conference paper at the 3rd International Conference for Learning Representations, San Diego, 2015, arXiv preprint arXiv:1412.6980, v9, Jan. 30, 2017, pp. 1-15.

(Continued)

*Primary Examiner* — Alina A Boutah

(57) ABSTRACT

Methods and systems are described for indicating and configuring machine learning (ML) model support in a user equipment (UE) in a network. A UE can provide model support information to a node, including a ML type and/or version information of at least one model associated with a certain functionality. A network node uses the support information, and optionally previous model ID allocation information in current or other nodes, to determine at least one model ID, and signals it to the UE. The model ID refers to the model in subsequent model handling-related signaling between the UE and the node. The node assigns the model ID such that the UE and the node are aware that a given model ID refers to a given model or model version (e.g., the (Continued)

mapping is unique for the UE). The model ID can also be unique within a functional area, for example CSI reporting.

19 Claims, 13 Drawing Sheets

(56) References Cited

U.S. PATENT DOCUMENTS

| | | | | |
|---|---|---|---|---|
| 2022/0279341 | A1* | 9/2022 | Tomala | G06N 20/00 |
| 2023/0276264 | A1* | 8/2023 | Soldati | H04W 24/02<br>455/422.1 |
| 2023/0379692 | A1* | 11/2023 | Ren | H04L 41/16 |

OTHER PUBLICATIONS

3GPP TS 38.214 V16.7.0, "3rd Generation Partnership Project; Technical Specification Group Radio Access Network; NR; Physical layer procedures for data (Release 16)", Sep. 2021.

Duchi et al., "Adaptive subgradient methods for online learning and stochastic optimization", Journal of Machine Learning Research, 2010.

Lu et al., "Binarized Aggregated Network with Quantization: Flexible Deep Learning Deployment for CSI Feedback in Massive MIMO System", pp. 1-27, May 1, 2021.

Qualcomm, "New SI: Study on Artificial Intelligence (AI)/Machine Learning (ML) for NR Air Interface", RP-213599, 3GPP TSG RAN Meeting #94e, Dec. 6-17, 2021, Electronic Meeting.

* cited by examiner

ML MODEL SUPPORT AND MODEL ID HANDLING BY UE AND NETWORK

CROSS REFERENCE TO RELATED INFORMATION

This application is a national phase application of International Patent Application No. PCT/IB2023/054262, filed Apr. 25, 2023, which claims the benefit of United States of America priority application No. 63/334,603 filed on Apr. 25, 2022, titled "ML Model Support and Model ID Handling by UE and Network", the disclosure of which are hereby incorporated herein by reference in their entirety.

TECHNICAL FIELD

The present disclosure generally relates to the technical field of wireless communications and more particularly to use of machine learning and artificial intelligence.

BACKGROUND

The 5th generation mobile wireless communication system (NR) uses OFDM (Orthogonal Frequency Division Multiplexing) with configurable bandwidths and subcarrier spacing to efficiently support a diverse set of use-cases and deployment scenarios. With respect to the 4th generation system (LTE), NR improves deployment flexibility, user throughputs, latency, and reliability. The throughput performance gains are enabled, in part, by enhanced support for Multi-User MIMO (Multiple Input Multiple Output) (MU-MIMO) transmission strategies, where two or more UEs (user equipment) receive data on the same OFDM time frequency resources, i.e., spatially separated transmissions.

Artificial Intelligence (AI) and Machine Learning (ML) have been investigated as promising tools to optimize the design of air-interface in wireless communication networks in both academia and industry. Example use cases include using autoencoders for CSI (channel state information) compression to reduce the feedback overhead and improve channel prediction accuracy; using deep neural networks for classifying LOS (line of sight) and NLOS (non-line of sight) conditions to enhance the positioning accuracy; and using reinforcement learning for beam selection at the network side and/or the UE side to reduce the signaling overhead and beam alignment latency; using deep reinforcement learning to learn an optimal precoding policy for complex MIMO precoding problems.

In 3GPP NR standardization work, there will be a new release 18 study item on AI/ML for NR air interface starting in May 2022. This study item will explore the benefits of augmenting the air-interface with features enabling improved support of AI/ML based algorithms for enhanced performance and/or reduced complexity/overhead. Through studying a few selected use cases (CSI feedback, beam management and positioning), this SI (system information) aims at laying the foundation for future air-interface use cases leveraging AI/ML techniques.

When applying AI/ML on air interface use cases, different levels of collaboration between network nodes and UEs can be considered:

- No collaboration between network nodes and UEs: In this case, a proprietary ML model operating with the existing standard air-interface is applied at one end of the communication chain (e.g., at the UE side). And the model life cycle management (e.g., model selection/training, model monitoring, model retraining, model update) is done at this node without inter-node assistance (e.g., assistance information provided by the network node).
- Limited collaboration between network nodes and UEs: In this case, a ML model is operating at one end of the communication chain (e.g., at the UE side), but this node gets assistance from the node(s) at the other end of the communication chain (e.g., a gNB (base station in NR)) for its AI model life cycle management (e.g., for training/retraining the AI model, model update).
- Joint ML operation between network notes and UEs: In this case, it is assumed that the AI model is split with one part located at the network side and the other part located at the UE side. Hence, the AI model requires joint training between the network and UE, and the AI model life cycle management involves both ends of a communication chain.

Building the AI model, or any ML model, includes several development steps where the actual training of the AI model is just one step in a training pipeline. An important part in AI development is the ML model lifecycle management. This is illustrated in FIG. 1. The model lifecycle management typically includes:

- A training (re-training) pipeline:
  - a. With data ingestion referring to gathering raw (training) from a data storage. After data ingestion, there may also be a step that controls the validity of the gathered data;
  - b. With data pre-processing referring to some feature engineering applied to the gathered data, e.g., it may include data normalization and possibly a data transformation required for the input data to the AI model;
  - c. With the actual model training steps as previously outlined;
  - d. With model evaluation referring to benchmarking the performance to some model baseline. The iterative steps of model training and model evaluation continues until the acceptable level of performance (as previously exemplified) is achieved;
  - e. With model registration referring to register the AI model, including any corresponding AI-meta data that provides information on how the AI model was developed, and possibly AI model evaluations performance outcomes;
- A deployment stage to make the trained (or re-trained) AI model part of the inference pipeline;
- An inference pipeline;
  - a. With data ingestion referring to gathering raw (inference) data from a data storage;
  - b. With data pre-processing stage that is typically identical to corresponding processing that occurs in the training pipeline;
  - c. With model operational referring to using the trained and deployed model in an operational mode;
  - d. With data & model monitoring referring to validate that the inference data are from a distribution that aligns well with the training data, as well as monitoring model outputs for detecting any performance, or operational, drifts;
- A drift detection stage that informs about any drifts in the model operations.

UE Capability Handling

The UE capability framework specified in NR is given at a high-level in chapter 14 of TS 38.300 16.7.0. For simple reference below is an extract of that part:

14 UE Capabilities

The UE capabilities in NR rely on a hierarchical structure where each capability parameter is defined per UE, per duplex mode (FDD/TDD), per frequency range (FR1/FR2), per band, per band combinations, . . . as the UE may support different functionalities depending on those (see TS 38.306 [11]).

NOTE 1: Some capability parameters are always defined per UE (e.g. SDAP, PDCP and RLC parameters) while some other not always (e.g. MAC and Physical Layer Parameters).

The UE capabilities in NR do not rely on UE categories: UE categories associated to fixed peak data rates are only defined for marketing purposes and not signalled to the network. Instead, the peak data rate for a given set of aggregated carriers in a band or band combination is the sum of the peak data rates of each individual carrier in that band or band combination, where the peak data rate of each individual carrier is computed according to the capabilities supported for that carrier in the corresponding band or band combination.

For each block of contiguous serving cells in a band, the set of features supported thereon is defined in a Feature Set (FS). The UE may indicate several Feature Sets for a band (also known as feature sets per band) to advertise different alternative features for the associated block of contiguous serving cells in that band. The two-dimensional matrix of feature sets for all the bands of a band combination (i.e. all the feature sets per band) is referred to as a feature set combination. In a feature set combination, the number of feature sets per band is equal to the number of band entries in the corresponding band combination, and all feature sets per band have the same number of feature sets. Each band combination is linked to one feature set combination. This is depicted [in FIG. 2.] . . .

. . . In addition, for some features in intra-band contiguous CA, the UE reports its capabilities individually per carrier. Those capability parameters are sent in feature set per component carrier and they are signalled in the corresponding FSs (per Band) i.e. for the corresponding block of contiguous serving cells in a band. The capability applied to each individual carrier in a block is agnostic to the order in which they are signalled in the corresponding FS.

NOTE 2: For intra-band non-contiguous CA, there are as many feature sets per band signalled as the number of (groups of contiguous) carriers that the UE is able to aggregate non-contiguously in the corresponding band.

To limit signalling overhead, the gNB can request the UE to provide NR capabilities for a restricted set of bands. When responding, the UE can skip a subset of the requested band combinations when the corresponding UE capabilities are the same.

If supported by the UE and the network, the UE may provide an ID in NAS signalling that represents its radio capabilities for one or more RATs in order to reduce signalling overhead. The ID may be assigned either by the manufacturer or by the serving PLMN. The manufacturer-assigned ID corresponds to a pre-provisioned set of capabilities. In the case of the PLMN-assigned ID, assignment takes place in NAS signalling.

The AMF stores the UE Radio Capability uploaded by the gNB as specified in TS 23.501 [3].

The gNB can request the UE capabilities for RAT-Types NR, EUTRA, UTRA-FDD. The UTRAN capabilities, i.e. the INTER RAT HANDOVER INFO, include START-CS, START-PS and "predefined configurations", which are "dynamic" IEs. In order to avoid the START values desynchronisation and the key replaying issue, the gNB always requests the UE UTRA-FDD capabilities before handover to UTRA-FDD. The gNB does not upload the UE UTRA-FDD capabilities to the AMF.

SUMMARY

One embodiment under the present disclosure comprises a method performed by a UE for obtaining a configuration for a ML model. The method comprises providing one or more indications of ML model support information to a network node that describes one or more ML models available at the UE, the one or more indications of ML model support information indicating at least one of; one or more model indicators; and one or more model version indicators; and obtaining a ML model identifier from the network node that identifies one of the one or more ML models available at the UE.

Another embodiment of a method under the present disclosure is a method performed by a network node for configuring a ML model in a UE. The method comprises obtaining one or more indications of ML model support information from a UE that describe one or more ML models available at the UE, the one or more indications of ML model support information indicating at least one of; one or more model indicators; and one or more model version indicators. It further comprises determining a ML model identifier based at least in part on the one or more indications of ML model support information, the ML model identifier identifying one of the one or more ML models available at the UE; and signaling the ML model identifier to the UE.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1:
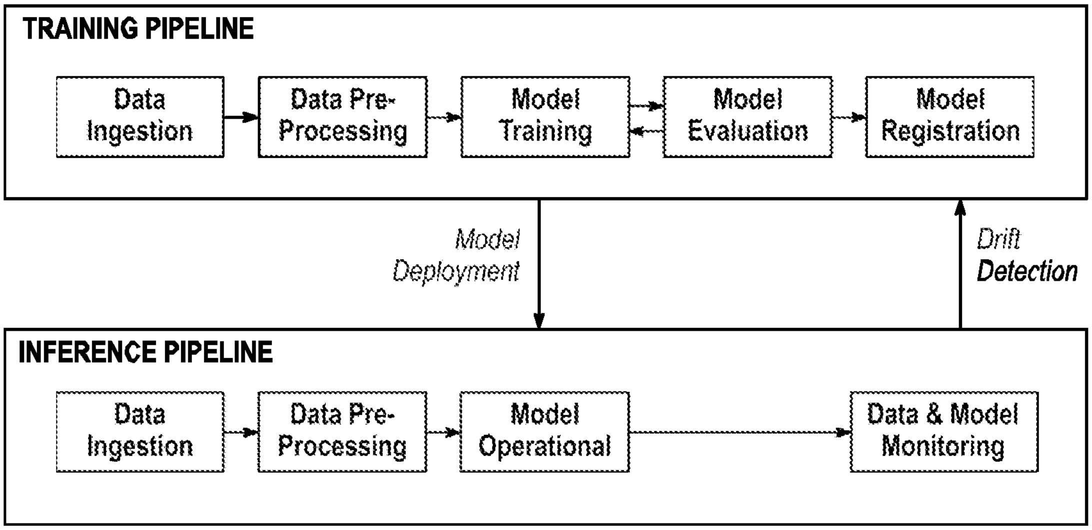
FIG. 1 illustrates an overview of a process flow of machine learning.
Figure 2:
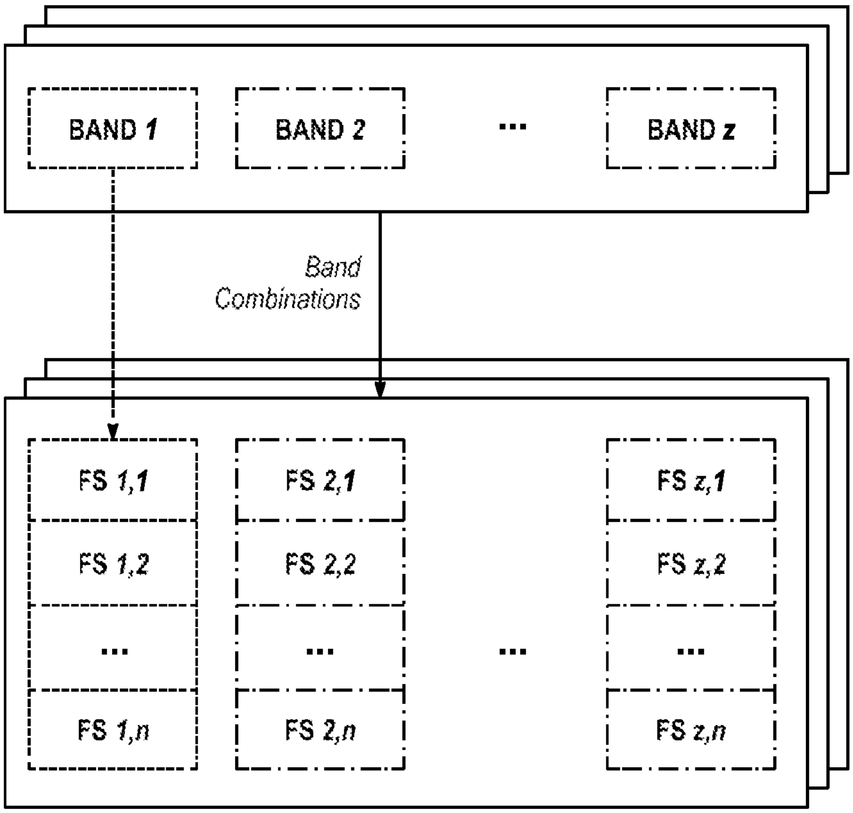
FIG. 2 illustrates standards-based feature set combinations from chapter 14 of TS 38.300 16.7.0.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed embodiments. In addition, the terminology used herein is for the purpose of describing the embodiments and is not necessarily intended to limit the scope of the claimed embodiments.

In the current disclosure, the term "ML model support" is used and can comprise at least "type" (fixed, specified for scenarios/use case) and "version" (updated over time) to emphasize differences of the current disclosure when compared to traditional capability reporting that describes fixed functionalities. The term "functionality" may be used in claims instead of "ML model", since "model" may not appear in 3GPP specifications.

There currently exist certain challenges in the use of ML and AI models in 5G and other networks. Using ML model for PHY (Physical Layer) operations requires flexible and efficient handling of such models, including e.g., activation/deactivation, updating, performance tracking and data drift indications, etc. The NW (network) and the UEs would preferably use a consistent and unambiguous way to refer to specific models during DL (downlink) and UL (uplink) signaling to control the model handling. It is also desirable that, when repetitively referencing a model, the associated signaling load be low. There is thus a need for an efficient ML model identification framework to ensure robust and unambiguous model control.

Furthermore, the NW also needs to receive info about supported or available ML models from the UE. The current UE capability reporting framework is not well suited for ML mode-related info, e.g., due to only capturing functionality types whereas model versioning and other model release characteristics may be critical for proper ML model selection and configuration. There is thus also a need for an improved model info provision solutions from the UE to the NW.

Certain aspects of the disclosure and their embodiments may provide solutions to these or other challenges. The current disclosure includes defining a method for obtaining a ML model ID in a UE, and for allocation and signaling the model ID by the NW.

In certain embodiments a UE provides ML model support info to a NW node, including at least one type or version info of at least one ML model associated with a certain functionality, for example CSI (Channel State Information) reporting, DMRS (Demodulation Reference Signal) pattern, beam reporting and so on. The info may be provided e.g., at connection establishment, during UE capability transfer from the UE to the NW node or on demand (upon request from the NW node, or based on an event triggered at the UE). The model version info may be provided by the UE e.g., to the core NW as part of connection establishment or via on-demand RAN (Radio Access Network) signaling (RRC (Radio Resource Control) or MAC CE (Control Element)).

In other embodiments a NW node uses the ML type and version info, and optionally previous ML model ID allocation info in current or other nodes, to determine at least one ML model ID, and signals it to the UE. The model ID is used to refer to the ML model in subsequent model handling-related signaling in DL and UL. The NW node assigns the model ID in such a way that both the UE and the NW are aware that a given ML model ID refers to a given ML model or ML model version (e.g., the mapping is unique for the UE). The ML-model ID can also be unique within a functional area for example CSI reporting. The model ID may be received by the UE e.g., using RRC or MAC CE signaling.

A short version of the model ID may be used for frequent model handling and signaling. Such a model ID allocation may be performed in a Radio Access Network node, such as a gNB (in the case of NG-RAN). It is unique on a per-UE or per-connection basis but need not be unique across UEs or over multiple sessions. The model ID may be a e.g., number or a character string.

A long version of the model ID may be further used to ensure consistency over multiple UEs employing the same model and/or across multiple connections. Allocation may be performed in different domains (e.g., not only in the RAN, but also in the Core Network, such as in a coordination node that is aware of previous allocations and/or allocations in other cells. This reduces the total number of model IDs distributed and enables aggregated model performance tracking. The ML model ID may be e.g., numerical or a character string, and comprise multiple parts, e.g., functional area code, configuration area code, model vendor and release code, and a NW suffix.

Certain embodiments can also include model sharing using the model ID, including split/transfer/federated learning.

Overviews of a UE-based embodiment and a NW-based embodiment are provided below.

One embodiment of the present disclosure is a method performed by a UE for obtaining a configuration for a ML model. This method can comprise:

- providing a ML model support info [model type indicator and one or more model version indicators] to a NW node, describing a ML model available at the UE; and
- obtaining a ML model ID from the NW node for the ML model available at the UE.

This method can comprise a variety of additional or alternative steps or variations. In some variations, obtaining the ML model ID comprises receiving a version configuration based on the multiple version indicator contents. Another embodiment can further comprise performing ML model handling-related signaling to and from the NW using the ML model ID to refer to the model available in the UE. In some embodiments, the ML model ID is unique among a first set of ML model IDs obtained from the NW at least for a current connection to the NW. In some variations the ML model ID is shorter than the type and version indicator contents. In other embodiments, the ML model ID comprises a numerical value or a character string. In some variations the ML model ID for the ML model available at the UE is consistent for multiple connections to the NW. In some variations, the steps of providing the ML model version indicator and obtaining the model ID occur two or more times during a connection to the NW.

Another embodiment of the present disclosure is a method performed by a network node for configuring a ML model in a UE. This method can comprise:

obtaining a ML model type and one or more ML model version indicators from a UE, describing an ML model available in the UE;

determining a ML model ID based on the type and version indicators; and signaling the ML model ID to the UE.

This method can comprise a variety of additional or alternative steps or variations. In some variations, signaling the ML model ID comprises selecting a preferred ML model version based on the multiple version indicators and configuring the UE to use the preferred version. Another embodiment can further comprise performing ML model handling-related signaling to and from the UE using the ML model ID to refer to the model available in the UE. In some embodiments the ML model ID is unique among a first set of ML model IDs signaled to the UE at least for a current connection to the UE. In some variations, the ML model ID is shorter than the type and version indicator contents. In other embodiments, the ML model ID for the ML model available at the UE is consistent for multiple connections of the UE, and optionally for multiple UEs in the NW. In some variations, the steps of providing the ML model version indicator and obtaining the model ID occur two or more times during a connection with the UE. In other variations, obtaining the ML model ID comprises determining the model ID having multiple parts, comprising one or more of functionality, configuration, release info, NW-related suffix. In some embodiments, obtaining the ML model ID comprises signaling the ML model version info to a coordination node and receiving the ML model ID from the coordination node. Some variations can further comprise performing ML model handling-related signaling to and from the UE using the ML model ID to refer to the model implemented in the UE. Other variations can further comprise aggregating performance and other statistics for the ML model from multiple UEs with same model versions based on consistent ML model IDs.

Embodiments under the present disclosure may provide one or more of the following technical advantages. The ML model ID framework enables unambiguous referencing of a multitude of ML models implemented or available in a UE for model handling and LCM (life cycle management) purposes. For short model ID, the number of bits assigned in the ML model ID is smaller than the number of bits used to identify the capability of a specific model, thus the usage of the ML model ID represents lower overhead over the air interface from/to the UE. Assuming the procedures requiring the handling of the ML model associated to the ML model ID occurs more often than the procedure for exchange of capability signaling, this advantage becomes even more relevant. The long model ID also enables aggregating model performance and other information from multiple UEs using the same model in multiple cells in the NW, for improved data drift and other performance tracking.

Some of the embodiments contemplated herein will now be described more fully with reference to the accompanying drawings. Embodiments are provided by way of example to convey the scope of the subject matter to those skilled in the art.

A machine learning model (ML model, AI model, AI/ML model) is a procedure representing a mathematical algorithm, which through training over a set of data, is parameterized such that the parameters and hyperparameters define the model. The hyperparameters define the model structure and model behavior, and are set manually. For example, for a ML model using a neural network algorithm, hyperparameters include: the number of layers, the number of neurons in each, each layer's activation functions, etc. Parameters are those obtained through learning or training with the data set, for example, weights at each neuron. It should be understood that some developers/entities use the term 'ML functionality' for generally the same purpose as 'ML model' is used herein. The same can be said of capability, function, and version. While the term 'ML model' is preferred herein, the underlying functionalities and capabilities described herein are applicable to a broad array of embodiments and not limited to any user's unique terminology.

An ML-model may correspond to a function which receives one or more inputs (e.g., measurements) and provide as outcome one or more prediction(s) of a certain type. In one example, an ML-model may correspond to a function receiving as input the measurement of a reference signal at time instance t0 (e.g., transmitted in beam-X) and provide as outcome the prediction of the reference signal in timer t0+T. In another example, an ML-model may correspond to a function receiving as input the measurement of a reference signal X (e.g., transmitted in beam-x), such as an SSB (Synchronization Signal Block) whose index is 'x', and provide as outcome the prediction of other reference signals transmitted in different beams e.g., reference signal Y (e.g., transmitted in beam-x), such as an SSB whose index is 'x'. Another example is a ML model for aid in CSI estimation, in such a setup the ML-model will be specific ML-model with a UE and an ML-model within the NW side. Jointly both ML-models provide joint network. The function of the ML-model at the UE would be to compress a channel input and the function of the ML-model at the NW side would be to decompress the received output from the UE. It is further possible to apply something similar for positioning wherein the input may be a channel impulse in some form related to a certain reference point in time. The purpose on the NW side would be to detect different peaks within the impulse response, that corresponds to different reception directions of radio signals at the UE side. For positioning another way is to input multiple sets of measurements into an ML network and based on that derive an estimated positioning. Another ML-model would be an ML-model to be able to aid the UE in channel estimation or interference estimation for channel estimation. The channel estimation could for example be for the PDSCH (Physical Downlink Shared Channel) and be associated with specific set of reference signals patterns that are transmitted from the NW to the UE. The ML-model will then be part of the receiver chain within the UE and may not be directly visible within the reference signal pattern as such that is configured/scheduled to be used between the NW and UE. Another example of an ML-model for CSI estimation is to predict a suitable CQI (Channel Quality information), PMI (Precoder Matrix Indicator), RI (Rank indication), or similar value into the future. The future may be a certain number of slots after the UE has performed the last measurement or targeting a specific slot in time within the future.

In the discussion of one possible embodiment below, a ML model type and model version are provided by the UE. The model type refers to a ML model for a certain use case or functionality, with a given set of hyperparameters and model parameters, that can operate on a given set of data features as input, and provides a desired output for the functionality in question. For a given ML model type, a ML model version refers to a given set of parameters, where parameters may vary depending on the selected data set for training. While the discussion below assumes that ML model type and ML model version are two separate entries which are used together to describe the exact ML model, it is also possible that a single entry is used instead, for example, by combining the {ML model type, ML model version} into one entry.

To be able to unambiguously identify a specific ML-model during UE operation it is envisioned that there is a need to associate each ML-model used by a UE with an ML model identifier (ID), where the ID may be e.g., a numerical value, a character string, a combination, or another entity that enables model identification. In certain embodiments under the present disclosure, the ML model ID can be assigned by the network upon receiving model type and version info from the UE. The ML-model ID may be used by the network for configuring and/or activating and/or de-activating ML-model(s) within the UE, or by the UE to refer to the model during status reporting or model handling requests.

Figure 3:
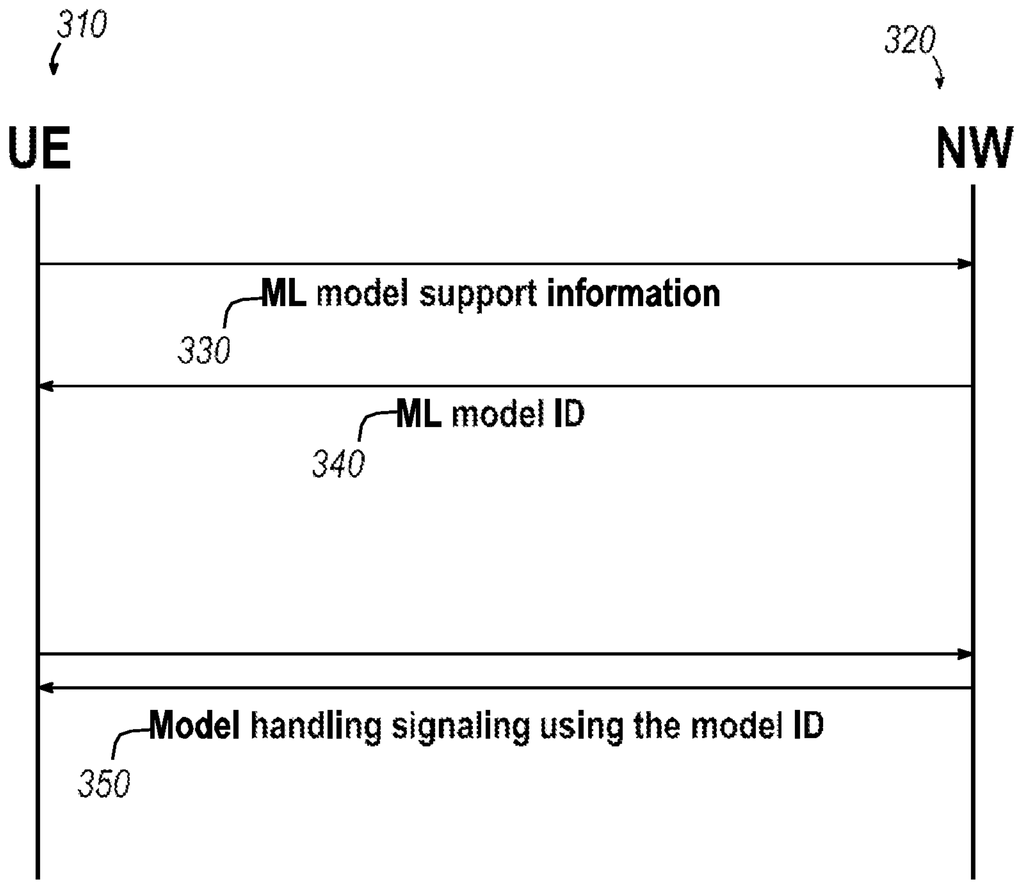
FIG. 3 shows a flow-chart of a method embodiment under the present disclosure.

Regardless of whether a short or long model ID is configured, the model ID may subsequently be used to refer to the model for various model handling procedures, both by the UE and the gNB (or other type of node). The high-level flow is depicted in FIG. 3. UE 310 is in communication with NW (core network or any type of node) 320. At step 330, the UE 310 sends ML model support information to the NW 320. NW 320 determines a model ID based on the received information and sends that ML model ID to the UE 310 at step 340. At 350, the UE 310 and NW 320 engage in model handling signaling using the model ID.

To structure or partition the signaling of the model type, the diverse ML-Model(s) can be first divided into functional areas and secondly in configuration parts. Some examples of functional parts and their respective configuration parts can be one or a combination of the following listed items:

CSI reporting
- a. CSI-RS configuration
- b. CSI reporting

Beam management

UE positioning

RRM (Radio Resource Management) measurement
- a. Mobility measurement, i.e., RSRP (Reference Signal Received Power), RSRQ (Reference Signal Received Quality), RSSI (Received Signal Strength Indicator), but also aspects related to radio link failure
- b. Learning and prediction of mobility for improving handover performance RRC state handling Dual or multi-connectivity operation Energy efficiency operation
- a. DRX (Discontinuous Reception) setting for UE power saving;
- b. network energy reduction by learning the traffic patterns and reducing the power of lightly loaded gNBs HARQ (Hybrid Automatic Repeat Request) transmission Radio resource planning and optimizations Data transmission Data reception
- a. DM-RS (Demodulation Reference Signal) configuration
- b. Time-frequency resource allocation
- c. Processing requirements Power control Since it is possible for the UE to update the ML-model it is operating for a certain function, the specific version or versions the UE supports may need to be known by the network. It could further be so that the network is only compatible with certain ML-model versions and hence it is critical for the network to know the ML-model version.

Additional information, used for creating the model ID could comprise model origin information such as:

Information associated to when the model was trained and released for deployment. Or when the parameters of the model were determined, for example by training the model.

Information about which vendor, network node, or operator that has trained, released, configured, or assigned the ML model version.

Summarizing the above, the model capability or availability signaling for one or more supported models, also referred to as model support, from the UE can hence include multiple different components—model type (functional area, configuration area), model version, model origin, etc.

When the UE reports its ML-model support, it may or may not be part of the UE capability report, where the ML model support include the supported ML-model type and version(s) supported for each of them. How the UE reports ML-model support may vary for each model type (functional area and configuration area). It could also be so that the ML-model types are reported with one mechanism and the ML-model version with another mechanism. For example, the supported ML-model types may be reported within the UE capabilities. While the ML-model versions may be reports within a separate framework outside the UE capabilities.

Based on the UE report of its ML model support, the network can identify the supported functionality, and accordingly configure the specific ML-model identified by at least a ML-model ID, which subsequently also identifies a functional area and configuration area when the model is referred to using its model ID.

After receiving the model ID configuration sent by the gNB, the UE may start to operate the ML-model in question until it is de-configured, or deactivated, or expired (i.e., no longer active). The configuration could also be a two-step mechanism wherein the UE is configured with a specific ML-model, including the model ID, by a first message, and the ML-model is later activated by a second message.

In an alternative embodiment, the UE indicates support for a specific ML-model with or without an ID and a specific version of that ML-model. The network assigns a second ID to that ML-model in the configuration step of the ML-model. This second ID is an ID that is a temporary identification between the network and the UE only. The purpose of this would be to minimize signaling and more easily address the specific ML-model.

In one embodiment, the steps of model version reporting by the UE and model ID provision may be performed multiple times during an ongoing connection/session with a UE. This would occur e.g., when the UE has obtained an updated model for a certain functionality (e.g., downloaded or locally retrained) and a new model ID is provided to distinguish the new version from the previous version.

Further description of certain embodiments is given below.

Model Type and Version Info Provision by UE to the NW

Certain embodiments focus on the provision of model type and version information to the NW by the UE.

Extension of Legacy IMEI Mechanisms

When the UE connects, including legacy operation, it provides the NW with its IMEI (International Mobile Equipment Identity) which defines the model/chipset and its specific hardware configuration. In one embodiment, the IMEI may encapsulate implemented ML model type and/or version info for one or more implemented models The IMEI does not contain additional software (SW) version info. The core network can request a SW version number (IMEI SV) if needed. In one embodiment, this currently 2-digit (0-99) value may include the above ML model type and version info. As an extension of the embodiment, the IMEI SV field range may be extended to a larger number of digits, e.g., 3-5 decimal positions, to accommodate more available model version info.

In one embodiment the UE transmits the IMEI (or IMEI SV) and upon reception, the network determines the one or more ML model types and/or ML model versions the UE supports. For example, by the network retrieving the ML model info from a look table based on the IMEI or IMEI SV, in a server hosted by the UE and/or the device vendor.

New framework for Reporting ML Model Support

In an improved embodiment, to support multiple models that may be updated relatively frequently, the IMEI framework is augmented by adding additional info fields, referred to here as MI (model information). The MI may be conveyed as an extension of the IMEI framework or as a new mechanism. The MI may contain e.g., one or more of the following fields/elements:

1. Model type info, e.g., the functional area and configuration area (as above);
2. Available UE model version;
   a. Or a list of multiple versions supported;
   b. or a range of model versions, possibly backwards compatible/equivalent;
3. gNB model version or interface version with which the implemented model is compatible (or a range of the same);
4. Computational complexity of the model (On a relative, pre-defined scale);
5. Scenario category to which the model applies (Propagation environment, CA/DC configuration, etc.);
6. Performance guarantee token, such as;
   a. Compliance with a performance category (possibly out of multiple options) defined in a standard
   b. Performance verification from an inter-vendor or 3rd-party testing entity
7. Model origin, such as;
   a. Vendor; or
   b. Time of creation/approval.

While the description of the model support reporting in some embodiments of the present disclosure is limited to model type and version components, multiple fields/items above may be included in other embodiments. For the purpose of generality, additional field contents may be viewed as part of the type and/or version definition.

The term "available model" may refer to a model that is implemented, stored, or downloaded in the UE, or that may be downloaded on demand to the UE.

In one embodiment, the MI fields may be structured as a list of decimal numbers, a list of binary fields of fixed or variable length, a string structure including field names, an ASN.1-like structure (Abstract Syntax Notation One), etc. The elements of the MI info structure may be represented e.g., as follows:

- The model type, expressed e.g., via the functional area and the configuration area, may be defined via predetermined indices or descriptive character strings, where the list of possible such indices or strings is specified in a standard document or via another previous agreement.
- Similar representation may be used for the scenario field.
- The UE and gNB version numbers may be binary or decimal numbers or character strings.
- Performance guarantee may be in the form of a granted performance certificate number, the name or a code for a certifying entity, etc.
- Model origin may be represented by date codes in numeric or string form and vendor/NW/operator names or codes from a list that may be looked up in a cloud service, an origin identifier ID or the type of origin/node, etc.

In one embodiment, the model version (MI case 2, above) may be pre-registered in an inter-vendor database that also contains additional model properties. In that case, some fields above in the MI signaling may be omitted. In another embodiment, the model version number is not pre-registered but the NW collects version numbers and corresponding performance info as it encounters UEs indicating given model versions. The collection may be from multiple cells in a NW, and/or from multiple NWs where the gNB are provided by the vendor.

In one embodiment, the gNB model version (case 3) reflects a split model version with which the UE model has been trained. In another embodiment, the version is a training interface version with which the UE model has been trained, where the gNB model as such needs not be specified.

In one embodiment, if the UE does not implement a relevant ML model but relies on legacy, non-ML algorithm, the model version code may be given as a predetermined special value (e.g., −1 or 0xFFFF). The model version value can more generally be interpreted as a functionality version or an algorithm version.

The legacy IMEI SV request and provision scheme is implemented in the core NW, which causes additional delay/overhead until a gNB gets the info. In one embodiment, the MI is requested and/or provided via RAN signaling. e.g., via RRC or MAC CE, using a common IE or separate IEs for parts of the listed elements.

For example, the MI contents may be conveyed via extensions or additions to the existing UE capability reporting framework. In one set of embodiments, the UE transmits the at least one ML version or other ML capability info of at least one ML model to the network e.g., NW node as part of the UE capability transfer procedure, included in the UECapabilityInformation message, as one or more Information Element(s) (IEs) and/or fields. In one option, this is transmitted by the UE in response to a request from the network e.g., in response to the reception of a UECapabilityEnquire message. The UECapabilityEnquire message may include an indication for the report of a specific ML version or other ML support info e.g., associated to the ML model of a specific function, such as an ML model for beam management (BM), or CSI compression. In another example the UE transmits the ML support, e.g., the Model types in the UECapabilityInformation message as one or more Information Element(s) (IEs) and/or fields e.g. UEModelVersions IE. Further the UE transmits the ML model version in separate fields and IEs that could be transmitted in a separate message (e.g., UEModelVersionsInformation message) then the UECapabilityInformation message but can also be appended to the UECapabilityInformation message.

In another embodiment, the report of the ML version or other ML support info of at least one ML model occurs upon the transition from IDLE to CONNECTED state.

Alternatively, the UE can do so when the UE has updated an ML-models version and trigger by itself to send message indicating new ML-model versions, e.g., for example by sending a UEModelVersionsInformation message. The message can include all the UE ML-model versions the UE supports (e.g., only the changed information since the last message was sent).

In another embodiment, the report of ML version or other ML support info of at least one ML model occurs during an attach or registration procedure, e.g., during the first time the UE connects to a PLMN (Public Land Mobile Network) (so that after this time, the network stores the information).

In another embodiment, at the network side, the ML version or other ML support info of at least one ML model of a given UE is provided from a source network node to a target network node during a handover e.g. in the Handover Request message, so that the target network node is able to determine which ML model the UE supports, and possibly determine whether to re-assign the ML model ID to the UE e.g. in the handover command/RRCReconfiguration message the UE applies upon the handover (reconfiguration with sync).

Model ID Allocation

Certain embodiments can now be described regarding model ID allocation scenarios. Short model ID and long model ID scenarios can be described.

Short Model ID

One objective of using the model ID is to deterministically and unambiguously refer to the model in ML model handling-related signaling during a current connection/session.

In one embodiment, the assigned ID is a short model ID that is unique for a certain ML model for the given UE during at least the current connection/session. Preferably, the short model ID is locally unique—the model ID is guaranteed to distinguish a certain ML model (type and version) from other ML models concurrently activated or configured in the UE. However, there is no guarantee that the same model in the same UE during a next connection would have the same ID, or that multiple UE's with the same model would obtain the same ID—multiple UEs with same model versions and supported functionality may be assigned different and uncoordinated model IDs at different occasions.

In one embodiment, the short model ID length may be a small number of bits, e.g., 3-6, determined by the maximum number of concurrent configured models for the UE, possibly including multiple versions of same model types (e.g. 8-64 in the above example). This results in low signaling overhead when repetitively referencing a model.

In another embodiment, the short model ID may contain additional fields, e.g., the model type code, version number, etc.

Long Model ID

In order to enable model performance tracking and other LCM procedures in the NW, it is desirable to minimize the number of ML model IDs and ensure that same ML model type and version is preferably labelled with the same model ID regardless of when in time or where in the NW it is encountered. This is often best achieved by allocating, or internally maintaining, a long model ID that is unique for the same model type/version over multiple connections/sessions and for multiple UEs and allows consistent model ID allocation over time and across the NW. Information collected about performance, scenario- or environment-dependent properties, data drift, etc. of specific models can thus be aggregated, drastically increasing the statistical basis for future handling and LCM decisions regarding each such ML model that the NW encounters.

In one class of embodiments, the NW includes a ML model ID coordination node that collects model version info and corresponding model ID info from multiple gNBs in a database. The coordination node may be a gNB, another RAN node, a special-purpose node, or a core NW entity (e.g., AMF (Access and Mobility Management Function)), in the Operation and Maintenance (O&M) system, or outside the PLMN's premises).

In one embodiment, the coordination node receives from a gNB model version info reported by a UE served by the gNB. The coordination node determines whether this version info has been present before and is present in the database. If found, the coordination node retrieves the model ID assigned to the model and passes it to the gNB. If not found, the coordination node determines a new model ID, passes it to the gNB, and registers in its database. The gNB can then signal the assigned model ID to the UE. Model performance statistics, data drift info, and other collected info by the gNB may be passed to the coordinating node where it is aggregated from multiple sources and stored centrally.

In another embodiment, to enable faster model activation, the gNB may initially determine a provisional model ID with contacting the coordination node, signal it to the UE. Model operation and handling procedures may be temporarily carried out using the provisional ID while the gNB communicates with the coordination node that may revise the model ID if such a model is already present in the database. The gNB may then update the model ID to the revised value for further communication with the UE. Model performance observations and other collected info, associated with the provisional ID, may be aggregated to the info associated with the revised model ID.

In one embodiment, the long model ID may correspond to a bit string of K bits, and the i-th part comprises K(i) bits so that K(1)+ . . . +K(N)=K, for N parts, and the K(i) number of bits may be the same or different for the different parts.

In one embodiment, the long model ID is equal to the model type and version info reported by the UE, or contains a subset of the model type and version info, e.g. a release signature and may add NW- or cell-specific identification elements.

UE Receiving Model-ID Configuration by NW and Related Signaling

In a set of embodiments, the UE receives a message assigning at least one ML-model ID to at least one ML model (which may also be received in the same message or may be previously stored at the UE). At the network side, the configuration of an ML model (associated to the ML-model ID the UE is being assigned) may be based on reported UE support related to AI/ML.

In one embodiment, the ML-model is associated to a UE ML support, so that the UE reports whether it is capable of a specific ML-Model associated to a first ML-model ID X, which is a fixed ML-model ID X stored at the network side upon ML support report from the UE (the number of bits encoding the ML Model-ID X is N1). Then, the UE receives a message indicating that a function is to use the ML-model associated to the ML-Model ID X, and assigns a second ML-model ID Y to the ML-model with ML-model ID X, creating a mapping between the ML-model of the function, the ML-model ID X and the ML-model ID Y, wherein the number of bits encoding the ML Model-ID Y is N2<N1. An example is shown below:

Configuration of function A received by the UE:

ML-model=Model-ID X, with N1 bits (as reported in capabilities);

Short ML model-ID=Model-ID Y, with N2 bits;

In one option, the Short ML model-ID (and its mapping) is used while the UE is in RRC_CONNECTED.

In another option, the Short ML model-ID (and its mapping) is released when the UE enters RRC_IDLE.

In another option, the Short ML model-ID (and its mapping) is stored when the UE enters RRC_INACTIVE.

In another option, the Short ML model-ID (and its mapping) is restored when the UE initiates the RRC Resume procedure, so that the model and its mapping may be released or resumed upon reception of a message resuming the connection (e.g., RRCResume).

One advantage of using a short ML Model-ID (and its mapping) is that the UE may receive indications from the network more often than the UE executes the ML model support or capability reporting procedure e.g., at every handover, state transitions, during beam management operations via DCI or MAC CEs, etc. Another advantage of mapping a model with a fewer number of bits is to enable the reception at the UE needs to receive a lower layer protocol message which has a limited number if bits in its design, such as a MAC layer Control element (MAC CE) including an ML-model ID during beam management operations via DCI or MAC CEs, etc.

In another embodiment, the message in which the UE receives the mapping is an RRC message, such as one or more of: i) RRC Reconfiguration; ii) RRC Resume; iii) RRC Release. In the case of an RRC Reconfiguration, the model ID is assigned by the source network node (e.g., the gNodeB the UE is connected to, in the case the UE is connected to an NG-RAN). In another option, in a handover scenario, the model ID is assigned by a target network node (e.g., the gNodeB the UE is going to connected to in a handover, in the case the UE is connected to an NG-RAN).

In another embodiment, the UE receives a first RRC message indicating the addition of an ML model which has Model-ID X, wherein the message also indicated the assignment of a Model ID-Y (mapping). That first RRC message is of a first type (e.g., RRC Reconfiguration). Then, the UE receives a second message (of the first type or of a different type) indicating the modification of the mapping or re-configuration of the ML model of Model-ID X, upon which the UE identifies the model of Model-ID YX, by reception of the Model ID-Y.

In another embodiment, the UE receives a first RRC message indicating the addition of an ML model which has Model-ID X, wherein the message also indicated the assignment of a Model ID-Y (mapping). That first RRC message is of a first type (e.g., RRC Reconfiguration). Then, the UE receives a second message (of the first type or of a different type, e.g., RRC Resume) indicating the release of the mapping, upon which the UE releases the association between the ML-model of Model-ID X and the Model ID-Y.

In one embodiment, obtaining the ML model ID comprises receiving a version configuration based on the multiple version indicator contents. This occurs when the UE has indicated that multiple versions of a ML model for a certain model type are available and the NW determines and signals to the UE which of the versions will be configured. The selected version info may be provided in the same IE as the model ID info or an additional IE.

ML-Model ID, Model Version and Model Sharing

The ML model ID and ML model version can be used to facilitate model sharing. This is illustrated with exemplary embodiments below. Examples include: no training at the UE; transfer learning; federated learning; and reinforcement learning. While various methods of model sharing are illustrated separately, it is possible that different model ID uses different methods of model sharing. For example, model ID #1 is for beam prediction and uses transfer learning, model ID #2 is for CQI determination and uses local training, model ID #3 is for UE positioning and uses federated learning. A person of skill in the art will recognize that other similar arrangements and combinations are within the embodiments of the present disclosure (e.g., model ID #1 uses local training, model ID #2 does not use local training, etc.).

No Training at the UE

When the UE does not perform training locally, the UE receives a model version from a central node, and uses it as is. Each UE receives one or more versions from the central node. Each UE may receive different version(s) from the central node.

Figure 4:
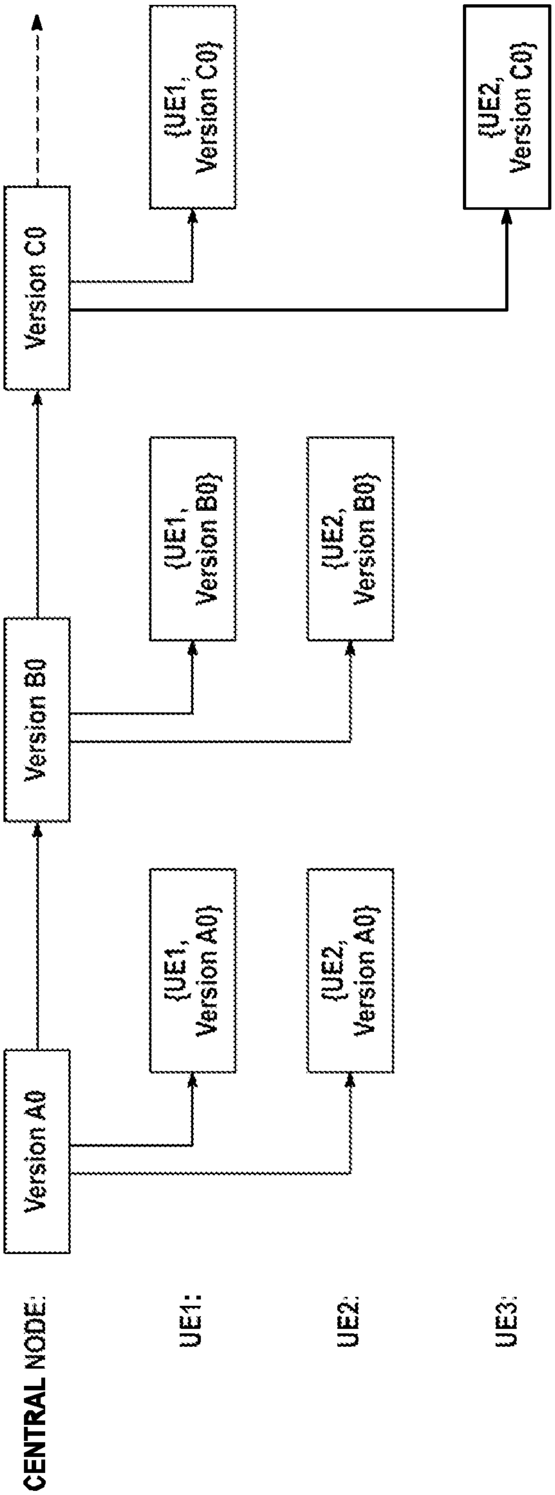
FIG. 4 illustrates one embodiment of treatment of machine learning model versions by UEs and a central node in certain embodiments of the present disclosure.

This is illustrated in FIG. 4. In this example, from the central node, UE1 received Versions {A0, B0, C0}, UE2 received Versions {A0, B0}, UE3 received Versions {C0}.

For a given model ID, the UE can report {UE-ID, model ID, model version} to the gNB, where the model version is currently active. The reporting can be done each time the UE changes to a different model version, or when the reporting request is sent by the gNB. For a given ML model ID, the model version at each UE can be received and recorded, where the UE does not perform training locally. The currently active {UE-ID, model ID, model version} is reported to the gNB when needed.

Transfer Learning

In transfer learning, the model training happens twice or more. For example, a first training is performed at a first entity with a first data set to arrive at model version A0. After that, the trained model of version A is transferred to a second entity where further training is performed by the second entity to arrive at model version A1. The further training at the second entity is performed with a second data set which is, for example, the local data set at the second entity.

In one example, the first entity is a central repository or central node, which uses offline data set to train and arrive at model version A0. The second entity is a UE, where the UE receives the model version A0 from the central repository and trains with a local data set to arrive at model version A1. Different UEs can train and arrive at different parameter values, i.e., the ML models can be identified by {UE-ID, ML model version A0}. A given UE may operate with its model version A1, and then re-train and arrive at its model version A2 when retraining is triggered (e.g., to handle drift). Similarly, retraining can be performed numerous times, and generate model versions A1, A2, A3, . . . . For a given model ID, the UE can report {UE-ID, model ID, model version} to the gNB, where the model version is currently active. The reporting can be done each time the UE changes to a different model version, or when the reporting request is sent by the gNB. For the given model ID, the central repository may update from model version A0 to B0. In this case, the UE may receive model version B0 from the central repository, perform training with local data set, and arrive at model version B1. Then model version B1 replaces model Aj, where Aj was the last model versions the UE trained from A0. Then the UE continues the operation, and potentially further training, with model version B1.

Figure 5:
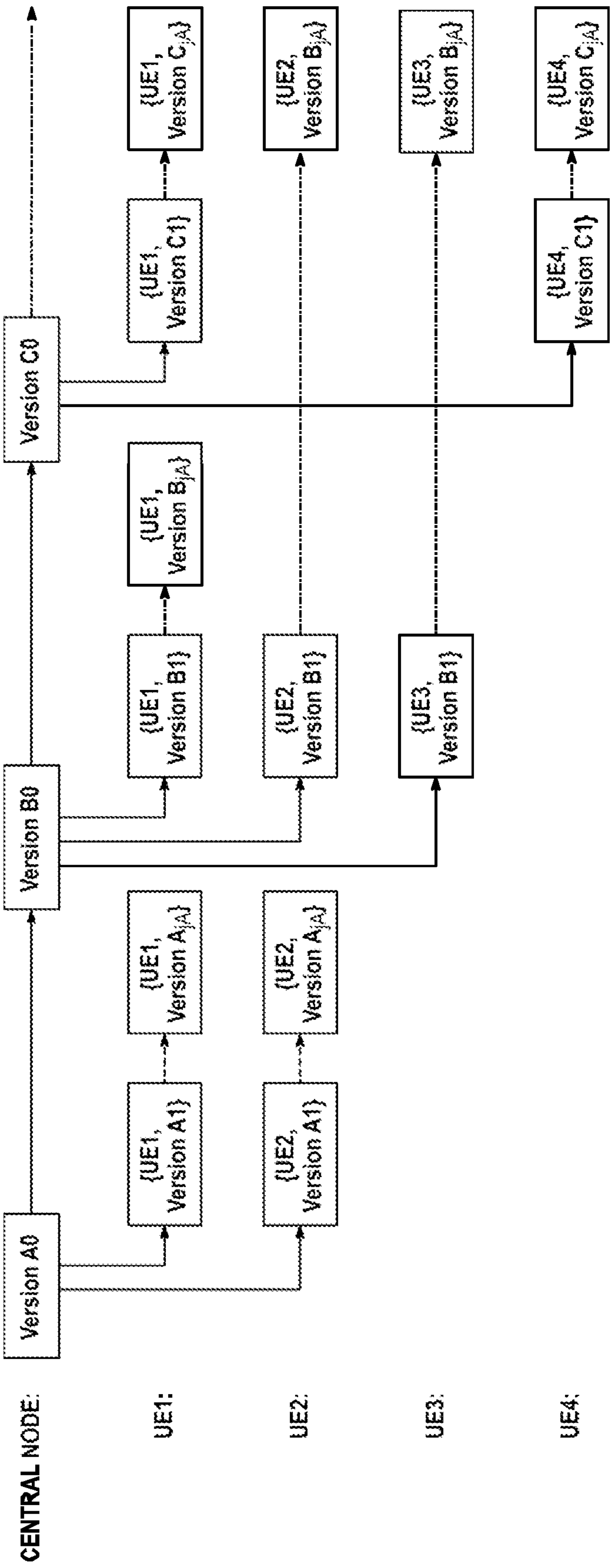
FIG. 5 illustrates another embodiment of treatment of machine learning model versions by UEs and a central node in certain embodiments of the present disclosure.

This is illustrated in FIG. 5, where 4 UEs are illustrated. Each UE receives one or more versions from the central node, and performs further training locally. Each UE may receive different version(s) from the central node. For example, from the central node, UE1 received Versions {A0, B0, C0}, UE2 received Versions {A0, B0}, UE3 received Version {B0}, UE4 received Version {C0}. For a given ML model ID, the model versions at each UE are recorded, when transfer learning is applied. The currently active {UE-ID, model ID, model version} can be reported to the gNB when needed. The transfer learning can be performed separately for each model ID, e.g., model ID #1 for beam prediction, model ID #2 for CQI determination, model ID #3 for UE positioning with PRS, etc.

Federated Learning

In federated learning, local models at multiple entities are sent to a central node, where the central node derives a new model based on the multiple local models. For example, the central node may perform averaging over the multiple local models to arrive at the new model. This procedure may happen several times.

Figure 6:
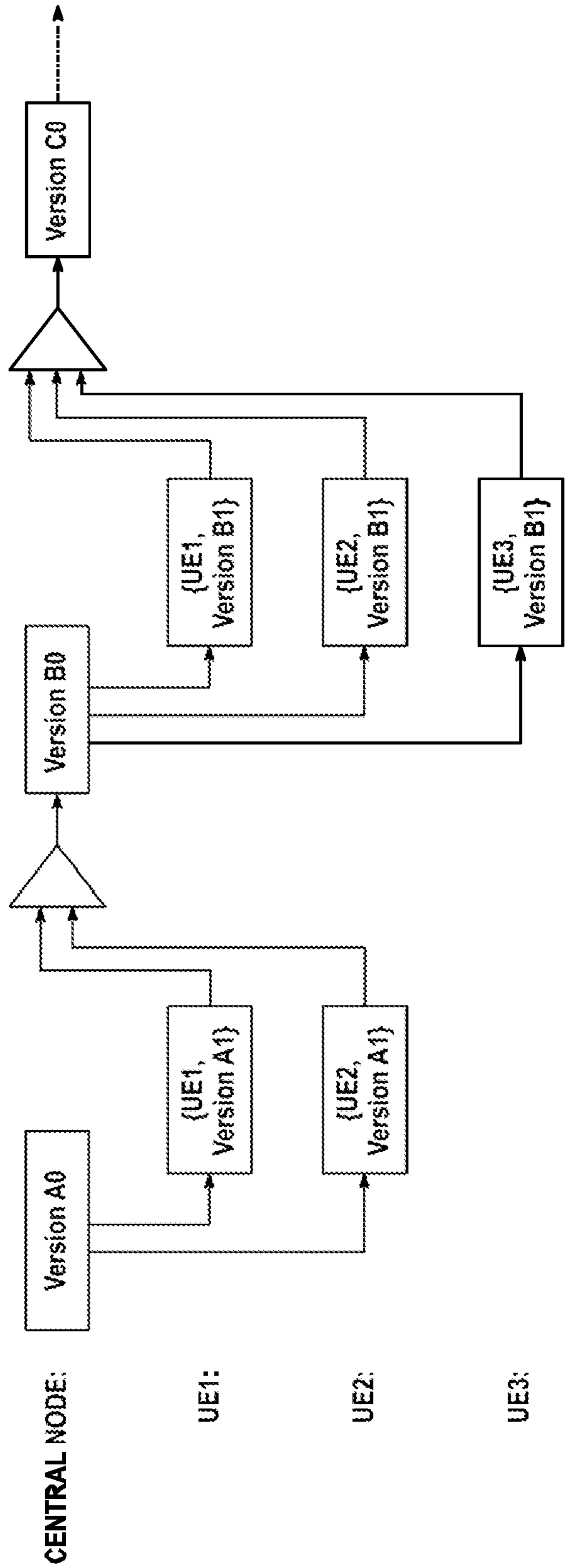
FIG. 6 illustrates another embodiment of treatment of machine learning model versions by UEs and a central node in certain embodiments of the present disclosure.

In one example, the multiple entities are multiple UEs, the central node is a network node. This is illustrated in FIG. 6. The central node uses an offline data set to train and arrive at model version A0. Then UE1 and UE2 each receives model version A0 from the central node, and performs local training to arrive at {UE1, Version A1}, {UE2, Version A1}, respectively. The central node then receives {UE1, Version A1}, {UE2, Version A1} and derives an updated Version B0. After that, Version B0 is available to UEs from the central node, and UE1, UE2, and UE3 receives it. Each UE then performs local training to arrive at {UE1, Version B1}, {UE2, Version B1}, {UE3, Version B1}, respectively. For a given ML model ID, the model versions at each UE are recorded, when federated learning is applied. The currently active {UE-ID, model ID, model version} is reported to the gNB when needed.

While only one local training is illustrated in FIG. 6, it is possible that a UE performs numerous local trainings to arrive at numerous local versions, and each time the UE records the version that's currently active. For a given model ID, the UE can report {UE-ID, model ID, model version} to the gNB, where the model version is currently active. The reporting can be done, e.g., each time the UE changes to a different model version, or when the reporting request is sent by the gNB. The federated learning can be performed separately for each model ID, e.g., model ID #1 for beam prediction, model ID #2 for CQI determination, model ID #3 for UE positioning with PRS, etc.

Reinforcement Learning

Reinforcement learning (RL) is a type of machine learning scheme where the algorithm continuously interacts with its environment and is given implicit and sometimes delayed feedback in the form of reward signals. Reinforcement learning performs short-term reward maximization but can also take short-time irrational decisions for long-term gains. Such algorithms try to maximize the expected future reward by exploiting already existing knowledge and exploring the space of actions in different network scenarios. The device can for example use RL to find the optimal selection for a certain context information, such as the device recommended DRX parameter given the observed traffic for enabling device energy savings.

Figure 7:
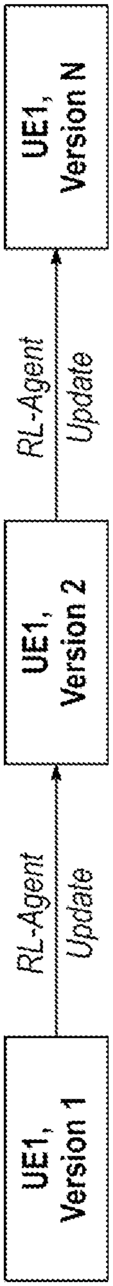
FIG. 7 illustrates another embodiment of treatment of machine learning model versions by UEs and a central node for reinforcement learning in certain embodiments of the present disclosure.

One embodiment of RL is shown in FIG. 7. In one example, each UE updates/trains such an RL-agent via exploration with the environment, and in each interaction in the environment its model ID is updated. Or in another embodiment, when the action for a certain state is modified. Note that the UE version 1 could, similar to transfer learning, be initialized by a central node, hence version 1 could be shared among UEs.

Figure 8:
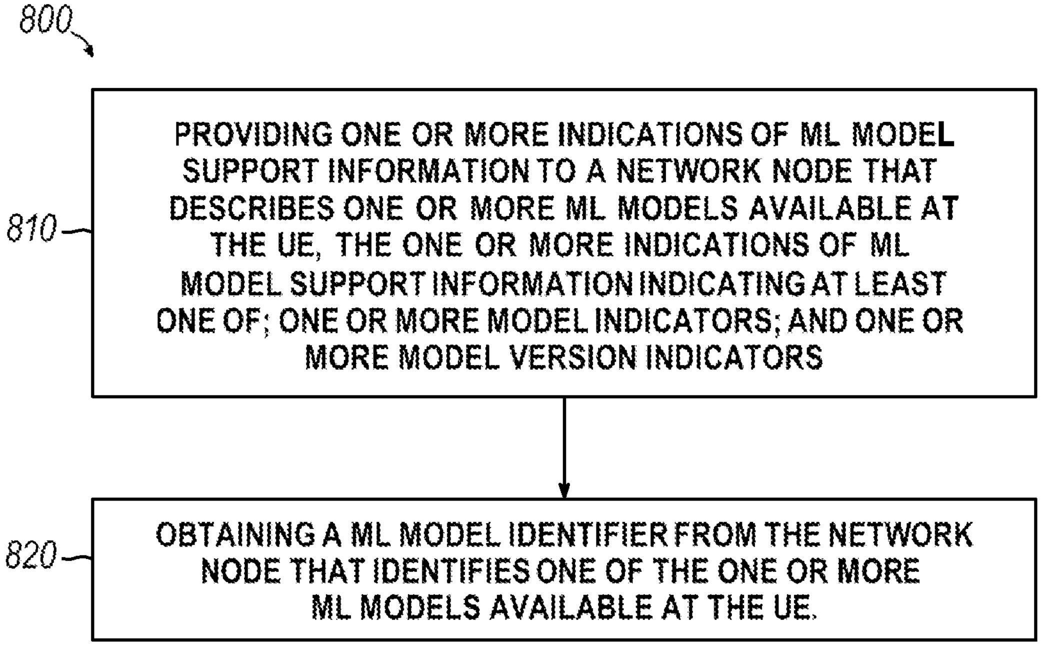
FIG. 8 shows a flow-chart of a method embodiment under the present disclosure.

FIG. 8 shows a possible method embodiment under the present disclosure. Method 800 is a method performed by a UE for obtaining a configuration for a ML model. Step 810 is providing one or more indications of ML model support information to a network node that describes one or more ML models available at the UE, the one or more indications of ML model support information indicating at least one of; one or more model indicators; and one or more model version indicators. Step 820 is obtaining a ML model identifier from the network node that identifies one of the one or more ML models available at the UE.

Method 800 can comprise a variety of additional or alternative steps such as described herein and including at least the following variations. For example, in some embodiments, the method can further comprise performing the identified ML model. In some embodiments, the ML model identifier comprises a short model identifier, the short model identifier configured to be at least one of: unique for the UE for an identified ML model for at least a current session; a number of bits determined by the maximum number of concurrent configured models for the UE; comprised of additional fields including at least one of a model type code and a version number. In some cases, the ML model identifier comprises a long model identifier, the long model identifier configured to be unique for the same model type or model version over multiple sessions and for multiple UEs and allows consistent model identifier allocation over time and across the network. In some variations the long model identifier contains at least one of: at least a portion of the one or more indications of ML model support information reported by the UE; network specific identification elements; cell specific identification elements. In some embodiments obtaining the ML model identifier comprises receiving a version configuration based on the one or more model version indicators. In some cases the method further comprises performing ML model handling-related signaling to and from the network using the ML model identifier to refer to the ML model available in the UE. In some variations the ML model identifier is shorter than at least one of: the one or more model indicators; and the one or more model version indicators. In some embodiments the ML model identifier comprises a numerical value or a character string. In some embodiments obtaining the ML model identifier from the network comprises receiving a version configuration based on the one or more version indicators. In some embodiments of method 800 obtaining the ML model identifier from the network is performed multiple times and a new model identifier is provided to distinguish a new model version from a previous model version. In some cases the new model identifier is provided in response to an update to the ML model. In some embodiments the one or more model indicators refer to an ML model for a given functionality, with an associated one or more hyperparameters and one or more model parameters, that can operate on a given set of data features as input, and provides a desired output for the given functionality. In some embodiments, the one or more model version indicators refer to one or more parameters, wherein the one or more parameters may vary depending on the selected data set for training. In some embodiments the one or more model indicators and one or more model version indicators are combined into one entry. In some embodiments the one or more indications of ML model support information comprise an International Mobile Equipment Identity (IMEI) that indicates the one or more model indicators and/or the one or more model version indicators. Some embodiments of method 800 further comprise receiving the identified ML model from a network node. Some variations further comprise performing training of the identified ML model to yield a new version of the identified ML model. In some cases the method further comprises transmitting the new version of the identified ML model to a network node. In some cases the training comprises at least one of: transfer learning; federated learning; reinforcement learning.

Figure 9:
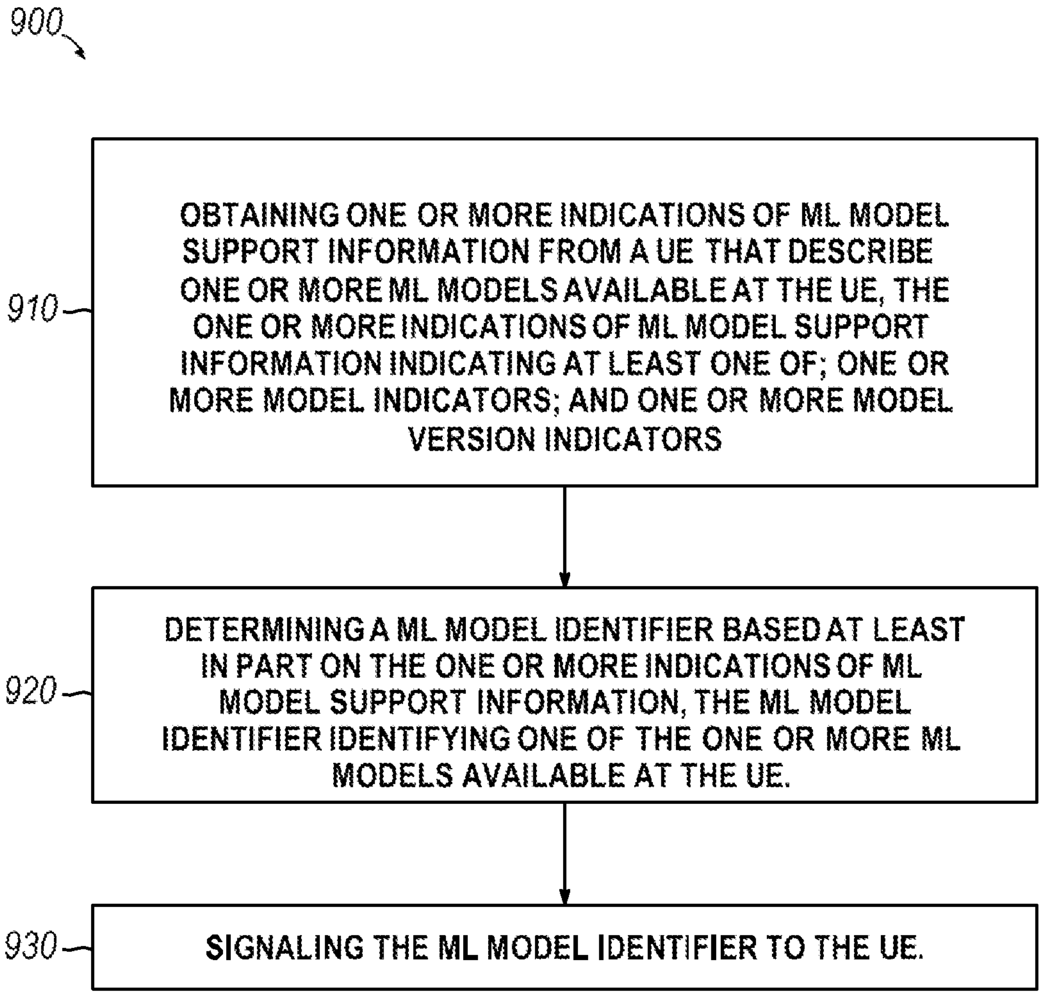
FIG. 9 shows a flow-chart of a method embodiment under the present disclosure.

FIG. 9 shows another possible method embodiment under the present disclosure. Method 900 is a method performed by a network node for configuring a ML model in a UE. Step 910 is obtaining one or more indications of ML model support information from a UE that describe one or more ML models available at the UE, the one or more indications of ML model support information indicating at least one of; one or more model indicators; and one or more model version indicators. Step 920 is determining a ML model identifier based at least in part on the one or more indications of ML model support information, the ML model identifier identifying one of the one or more ML models available at the UE. Step 930 is signaling the ML model identifier to the UE.

Method 900 can comprise a variety of additional or alternative steps, such as described herein, and including at least the following variations. For example, in some cases signaling the ML model identifier comprises selecting a preferred ML model version based on the one or more version indicators and configuring the UE to use the preferred version. In some variations the method further comprises performing ML model handling-related signaling to and from the UE using the ML model identifier to refer to the identified ML model. In some embodiments the ML model identifier is unique among a first set of ML model identifiers signaled to the UE at least for a current connection to the UE. In some cases the ML model identifier is shorter than the one or more model indicators and one or more model version indicators. In some examples the ML model identifier is consistent for multiple connections of the UE, and optionally for multiple UEs in the NW. In some cases the obtaining and signaling steps occur two or more times during a connection with the UE. In some embodiments determining the ML model identifier comprises determining one or more of; functionality; configuration; release information; a network-related suffix. In some variations determining the ML model identifier comprises signaling the one or more model indicators and/or one or more model version indicators to a coordination node and receiving the ML model identifier from the coordination node. In some variations the method further comprises aggregating statistics for the identified ML model from multiple UEs operating the same model version of the one or more model version indicators. In some cases signaling the ML model identifier to the UE comprises sending a version configuration based at least in part on the one or more model version indicators. In embodiments the one or more indications of ML model support information comprise an International Mobile Equipment Identity, IMEI, that indicates the one or more model indicators and/or the one or more model version indicators. In some cases the method further comprises transmitting the identified ML model to the UE. In some examples the method further includes receiving a new version of the identified ML model from the UE, the new version resulting from the UE performing a training of the identified ML model. In some variations the training comprises at least one of: transfer learning; federated learning; reinforcement learning.

Figure 10:
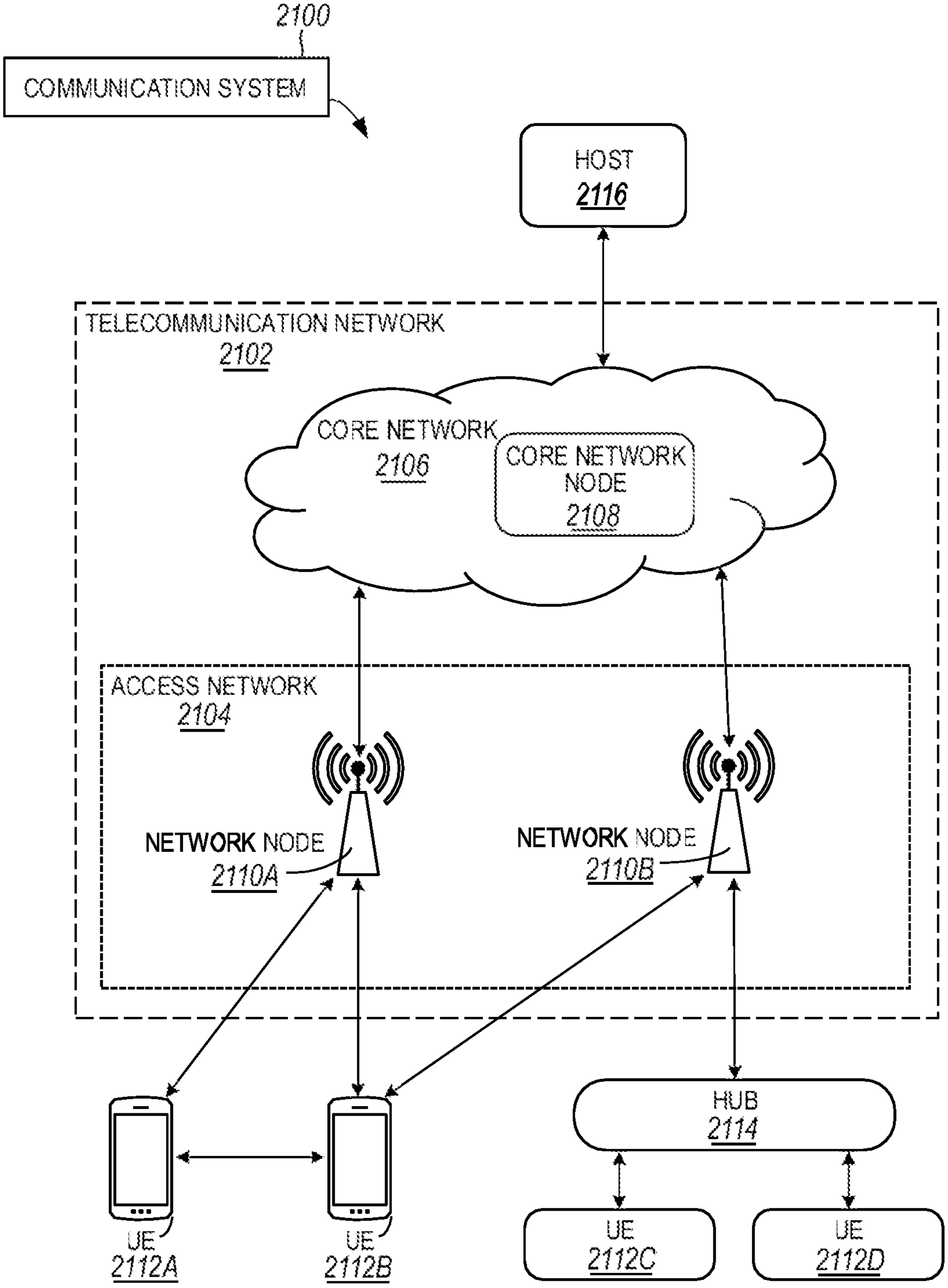
FIG. 10 shows a schematic of a communication system embodiment under the present disclosure.

FIG. 10 shows an example of a communication system 2100 in accordance with some embodiments. In the example, the communication system 2100 includes a telecommunication network 2102 that includes an access network 2104, such as a RAN, and a core network 2106, which includes one or more core network nodes 2108. The access network 2104 includes one or more access network nodes, such as network nodes 2110*a* and 2110*b* (one or more of which may be generally referred to as network nodes 2110), or any other similar 3rd Generation Partnership Project (3GPP) access node or non-3GPP access point. The network nodes 2110 facilitate direct or indirect connection of UE, such as by connecting UEs 2112*a*, 2112*b*, 2112*c*, and 2112*d* (one or more of which may be generally referred to as UEs 2112) to the core network 2106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 2100 may include and/or interface with any type of communication, telecommunication, data, cellular, radio network, and/or other similar type of system.

The UEs 2112 may be any of a wide variety of communication devices, including wireless devices arranged, configured, and/or operable to communicate wirelessly with the network nodes 2110 and other communication devices. Similarly, the network nodes 2110 are arranged, capable, configured, and/or operable to communicate directly or indirectly with the UEs 2112 and/or with other network nodes or equipment in the telecommunication network 2102 to enable and/or provide network access, such as wireless network access, and/or to perform other functions, such as administration in the telecommunication network 2102.

In the depicted example, the core network 2106 connects the network nodes 2110 to one or more hosts, such as host 2116. These connections may be direct or indirect via one or more intermediary networks or devices. In other examples, network nodes may be directly coupled to hosts. The core network 2106 includes one more core network nodes (e.g., core network node 2108) that are structured with hardware and software components. Features of these components may be substantially similar to those described with respect to the UEs, network nodes, and/or hosts, such that the descriptions thereof are generally applicable to the corresponding components of the core network node 2108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 2116 may be under the ownership or control of a service provider other than an operator or provider of the access network 2104 and/or the telecommunication network 2102, and may be operated by the service provider or on behalf of the service provider. The host 2116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 2100 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 2102 is a cellular network that implements 3GPP standardized features. Accordingly, the telecommunications network 2102 may support network slicing to provide different logical networks to different devices that are connected to the telecommunication network 2102. For example, the telecommunications network 2102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 2112 are configured to transmit and/or receive information without direct human interaction. For instance, a UE may be designed to transmit information to the access network 2104 on a predetermined schedule, when triggered by an internal or external event, or in response to requests from the access network 2104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio—Dual Connectivity (EN-DC).

In the example, the hub 2114 communicates with the access network 2104 to facilitate indirect communication between one or more UEs (e.g., UE 2112*c* and/or 2112*d*) and network nodes (e.g., network node 2110*b*). In some examples, the hub 2114 may be a controller, router, content source and analytics, or any of the other communication devices described herein regarding UEs. For example, the hub 2114 may be a broadband router enabling access to the core network 2106 for the UEs. As another example, the hub 2114 may be a controller that sends commands or instructions to one or more actuators in the UEs. Commands or instructions may be received from the UEs, network nodes 2110, or by executable code, script, process, or other instructions in the hub 2114. As another example, the hub 2114 may be a data collector that acts as temporary storage for UE data and, in some embodiments, may perform analysis or other processing of the data. As another example, the hub 2114 may be a content source. For example, for a UE that is a VR headset, display, loudspeaker or other media delivery device, the hub 2114 may retrieve VR assets, video, audio, or other media or data related to sensory information via a network node, which the hub 2114 then provides to the UE either directly, after performing local processing, and/or after adding additional local content. In still another example, the hub 2114 acts as a proxy server or orchestrator for the UEs, in particular in if one or more of the UEs are low energy IoT devices.

The hub 2114 may have a constant/persistent or intermittent connection to the network node 2110*b*. The hub 2114 may also allow for a different communication scheme and/or schedule between the hub 2114 and UEs (e.g., UE 2112*c* and/or 2112*d*), and between the hub 2114 and the core network 2106. In other examples, the hub 2114 is connected to the core network 2106 and/or one or more UEs via a wired connection. Moreover, the hub 2114 may be configured to connect to an M2M service provider over the access network 1104 and/or to another UE over a direct connection. In some scenarios, UEs may establish a wireless connection with the network nodes 2110 while still connected via the hub 2114 via a wired or wireless connection. In some embodiments, the hub 2114 may be a dedicated hub—that is, a hub whose primary function is to route communications to/from the UEs from/to the network node 2110*b*. In other embodiments, the hub 2114 may be a non-dedicated hub—that is, a device which is capable of operating to route communications between the UEs and network node 2110*b*, but which is additionally capable of operating as a communication start and/or end point for certain data channels.

Figure 11:
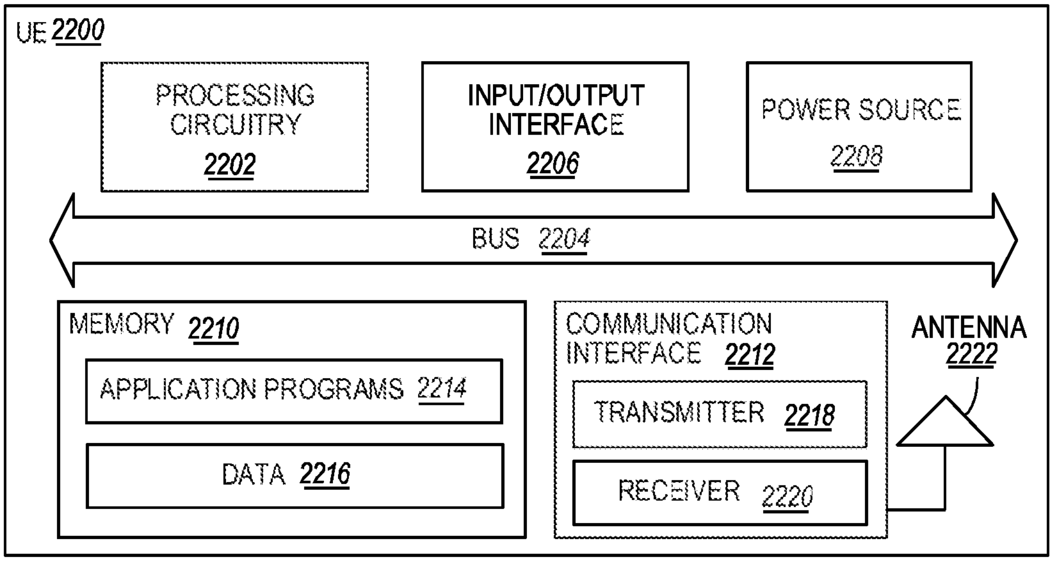
FIG. 11 shows a schematic of a user equipment embodiment under the present disclosure.

FIG. 11 shows a UE 2200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 2200 includes processing circuitry 2202 that is operatively coupled via a bus 2204 to an input/output interface 2206, a power source 2208, a memory 2210, a communication interface 2212, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry 2202 is configured to process instructions and data and may be configured to implement any sequential state machine operative to execute instructions stored as machine-readable computer programs in the memory 2210. The processing circuitry 2202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 2202 may include multiple central processing units (CPUs).

In the example, the input/output interface 2206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 2200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2208 is structured as a battery or battery pack. Other types of power sources, such as an external power source (e.g., an electricity outlet), photovoltaic device, or power cell, may be used. The power source 2208 may further include power circuitry for delivering power from the power source 2208 itself, and/or an external power source, to the various parts of the UE 2200 via input circuitry or an interface such as an electrical power cable. Delivering power may be, for example, for charging of the power source 2208. Power circuitry may perform any formatting, converting, or other modification to the power from the power source 2208 to make the power suitable for the respective components of the UE 2200 to which power is supplied.

The memory 2210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 2210 includes one or more application programs 2214, such as an operating system, web browser application, a widget, gadget engine, or other application, and corresponding data 2216. The memory 2210 may store, for use by the UE 2200, any of a variety of various operating systems or combinations of operating systems.

The memory 2210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 2210 may allow the UE 2200 to access instructions, application programs and the like, stored on transitory or non-transitory memory media, to off-load data, or to upload data. An article of manufacture, such as one utilizing a communication system may be tangibly embodied as or in the memory 2210, which may be or comprise a device-readable storage medium.

The processing circuitry 2202 may be configured to communicate with an access network or other network using the communication interface 2212. The communication interface 2212 may comprise one or more communication subsystems and may include or be communicatively coupled to an antenna 2222. The communication interface 2212 may include one or more transceivers used to communicate, such as by communicating with one or more remote transceivers of another device capable of wireless communication (e.g., another UE or a network node in an access network). Each transceiver may include a transmitter 2218 and/or a receiver 2220 appropriate to provide network communications (e.g., optical, electrical, frequency allocations, and so forth). Moreover, the transmitter 2218 and receiver 2220 may be coupled to one or more antennas (e.g., antenna 2222) and may share circuit components, software or firmware, or alternatively be implemented separately.

In the illustrated embodiment, communication functions of the communication interface 2212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 2212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 2200 shown in FIG. 10.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 12:
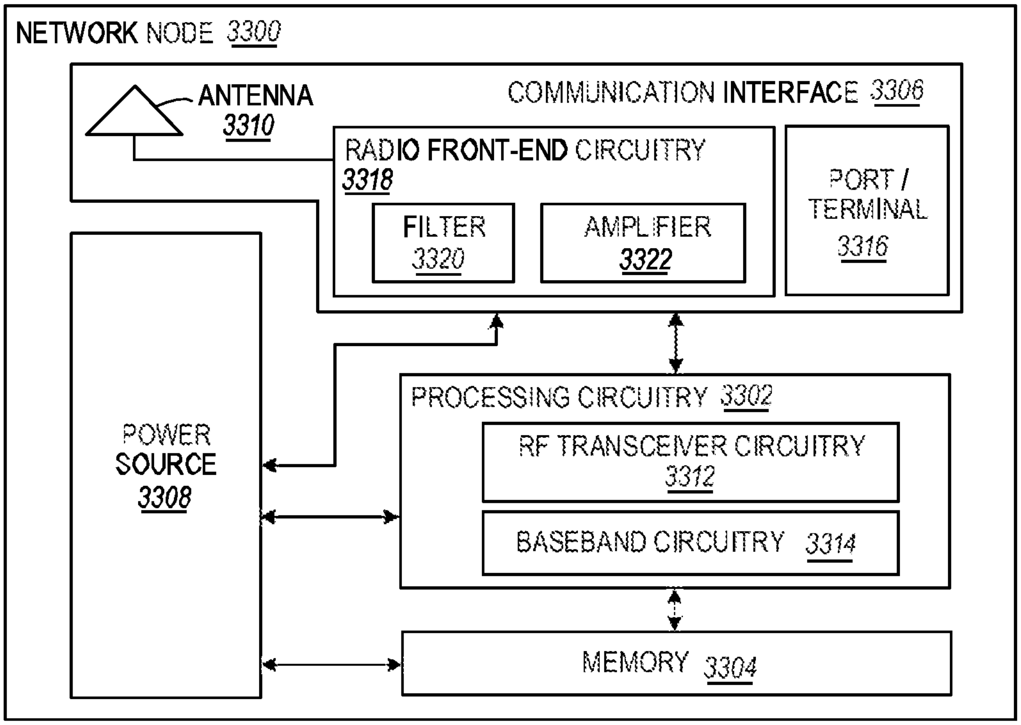
FIG. 12 shows a schematic of a network node embodiment under the present disclosure.

FIG. 12 shows a network node 3300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 3300 includes a processing circuitry 3302, a memory 3304, a communication interface 3306, and a power source 3308. The network node 3300 may be composed of multiple physically separate components (e.g., a NodeB component and a RNC component, or a BTS component and a BSC component, etc.), which may each have their own respective components. In certain scenarios in which the network node 3300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 3304 for different RATs) and some components may be reused (e.g., a same antenna 3310 may be shared by different RATs). The network node 3300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 3302 may comprise a combination of one or more of a microprocessor, controller, micro-controller, central processing unit, digital signal processor, application-specific integrated circuit, field programmable gate array, or any other suitable computing device, resource, or combination of hardware, software and/or encoded logic operable to provide, either alone or in conjunction with other network node 3300 components, such as the memory 3304, to provide network node 3300 functionality.

In some embodiments, the processing circuitry 3302 includes a system on a chip (SOC). In some embodiments, the processing circuitry 3302 includes one or more of radio frequency (RF) transceiver circuitry 3312 and baseband processing circuitry 3314. In some embodiments, the radio frequency (RF) transceiver circuitry 3312 and the baseband processing circuitry 3314 may be on separate chips (or sets of chips), boards, or units, such as radio units and digital units. In alternative embodiments, part or all of RF transceiver circuitry 3312 and baseband processing circuitry 3314 may be on the same chip or set of chips, boards, or units.

The memory 3304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 3302. The memory 3304 may store any suitable instructions, data, or information, including a computer program, software, an application including one or more of logic, rules, code, tables, and/or other instructions capable of being executed by the processing circuitry 3302 and utilized by the network node 3300. The memory 3304 may be used to store any calculations made by the processing circuitry 3302 and/or any data received via the communication interface 3306. In some embodiments, the processing circuitry 3302 and memory 3304 is integrated.

The communication interface 3306 is used in wired or wireless communication of signaling and/or data between a network node, access network, and/or UE. As illustrated, the communication interface 3306 comprises port(s)/terminal(s) 3316 to send and receive data, for example to and from a network over a wired connection. The communication interface 3306 also includes radio front-end circuitry 3318 that may be coupled to, or in certain embodiments a part of, the antenna 3310. Radio front-end circuitry 3318 comprises filters 3320 and amplifiers 3322. The radio front-end circuitry 3318 may be connected to an antenna 3310 and processing circuitry 3302. The radio front-end circuitry may be configured to condition signals communicated between antenna 3310 and processing circuitry 3302. The radio front-end circuitry 3318 may receive digital data that is to be sent out to other network nodes or UEs via a wireless connection. The radio front-end circuitry 3318 may convert the digital data into a radio signal having the appropriate channel and bandwidth parameters using a combination of filters 3320 and/or amplifiers 3322. The radio signal may then be transmitted via the antenna 3310. Similarly, when receiving data, the antenna 3310 may collect radio signals which are then converted into digital data by the radio front-end circuitry 3318. The digital data may be passed to the processing circuitry 3302. In other embodiments, the communication interface may comprise different components and/or different combinations of components.

In certain alternative embodiments, the network node 3300 does not include separate radio front-end circuitry 3318, instead, the processing circuitry 3302 includes radio front-end circuitry and is connected to the antenna 3310. Similarly, in some embodiments, all or some of the RF transceiver circuitry 3312 is part of the communication interface 3306. In still other embodiments, the communication interface 3306 includes one or more ports or terminals 3316, the radio front-end circuitry 3318, and the RF transceiver circuitry 3312, as part of a radio unit (not shown), and the communication interface 3306 communicates with the baseband processing circuitry 3314, which is part of a digital unit (not shown).

The antenna 3310 may include one or more antennas, or antenna arrays, configured to send and/or receive wireless signals. The antenna 3310 may be coupled to the radio front-end circuitry 3318 and may be any type of antenna capable of transmitting and receiving data and/or signals wirelessly. In certain embodiments, the antenna 3310 is separate from the network node 3300 and connectable to the network node 3300 through an interface or port.

The antenna 3310, communication interface 3306, and/or the processing circuitry 3302 may be configured to perform any receiving operations and/or certain obtaining operations described herein as being performed by the network node. Any information, data and/or signals may be received from a UE, another network node and/or any other network equipment. Similarly, the antenna 3310, the communication interface 3306, and/or the processing circuitry 3302 may be configured to perform any transmitting operations described herein as being performed by the network node. Any information, data and/or signals may be transmitted to a UE, another network node and/or any other network equipment.

The power source 3308 provides power to the various components of network node 3300 in a form suitable for the respective components (e.g., at a voltage and current level needed for each respective component). The power source 3308 may further comprise, or be coupled to, power management circuitry to supply the components of the network node 3300 with power for performing the functionality described herein. For example, the network node 3300 may be connectable to an external power source (e.g., the power grid, an electricity outlet) via an input circuitry or interface such as an electrical cable, whereby the external power source supplies power to power circuitry of the power source 3308. As a further example, the power source 3308 may comprise a source of power in the form of a battery or battery pack which is connected to, or integrated in, power circuitry. The battery may provide backup power should the external power source fail.

Embodiments of the network node 3300 may include additional components beyond those shown in FIG. 12 for providing certain aspects of the network node's functionality, including any of the functionality described herein and/or any functionality necessary to support the subject matter described herein. For example, the network node 3300 may include user interface equipment to allow input of information into the network node 3300 and to allow output of information from the network node 3300. This may allow a user to perform diagnostic, maintenance, repair, and other administrative functions for the network node 3300.

Figure 13:
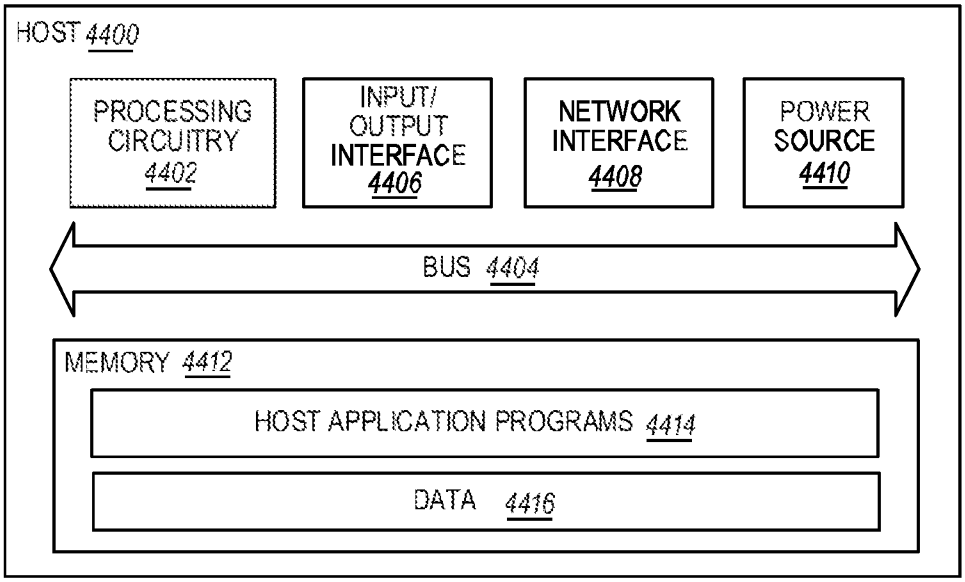
FIG. 13 shows a schematic of a host embodiment under the present disclosure.

FIG. 13 is a block diagram of a host 4400, which may be an embodiment of the host 2116 of FIG. 10, in accordance with various aspects described herein. As used herein, the host 4400 may be or comprise various combinations hardware and/or software, including a standalone server, a blade server, a cloud-implemented server, a distributed server, a virtual machine, container, or processing resources in a server farm. The host 4400 may provide one or more services to one or more UEs.

The host 4400 includes processing circuitry 4402 that is operatively coupled via a bus 4404 to an input/output interface 4406, a network interface 4408, a power source 4410, and a memory 4412. Other components may be included in other embodiments. Features of these components may be substantially similar to those described with respect to the devices of previous figures, such as FIGS. 10 and 11, such that the descriptions thereof are generally applicable to the corresponding components of host 4400.

The memory 4412 may include one or more computer programs including one or more host application programs 4414 and data 4416, which may include user data, e.g., data generated by a UE for the host 4400 or data generated by the host 4400 for a UE. Embodiments of the host 4400 may utilize only a subset or all of the components shown. The host application programs 4414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 4414 may also provide for user authentication and licensing checks and may periodically report health, routes, and content availability to a central node, such as a device in or on the edge of a core network. Accordingly, the host 4400 may select and/or indicate a different host for over-the-top services for a UE. The host application programs 4414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 14:
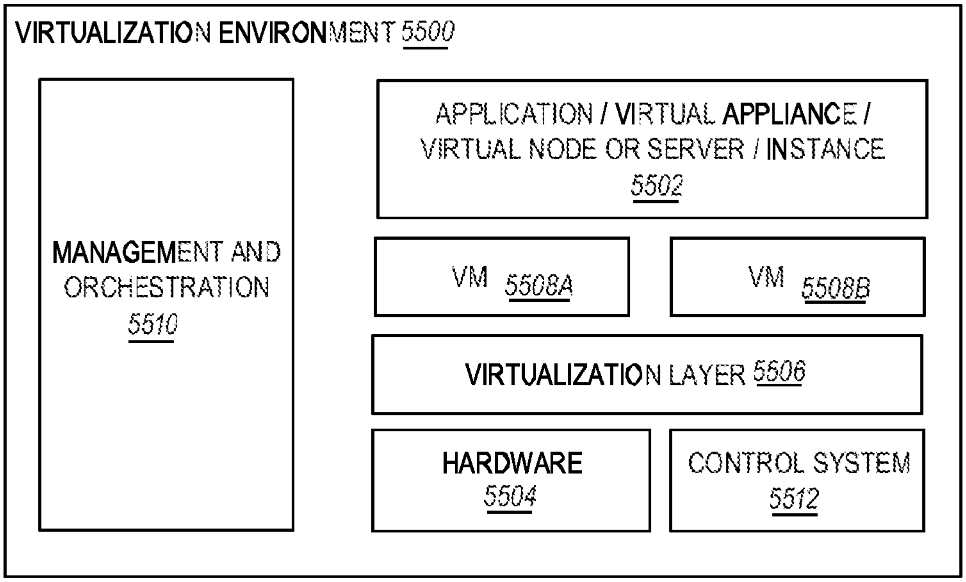
FIG. 14 shows a schematic of a virtualization environment embodiment under the present disclosure.

FIG. 14 is a block diagram illustrating a virtualization environment 5500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 5500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 5502 (which may alternatively be called software instances, virtual appliances, network functions, virtual nodes, virtual network functions, etc.) are run in the virtualization environment 5500 to implement some of the features, functions, and/or benefits of some of the embodiments disclosed herein.

Hardware 5504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 5506 (also referred to as hypervisors or virtual machine monitors (VMMs)), provide VMs 5508*a* and 5508*b* (one or more of which may be generally referred to as VMs 5508), and/or perform any of the functions, features and/or benefits described in relation with some embodiments described herein. The virtualization layer 5506 may present a virtual operating platform that appears like networking hardware to the VMs 5508.

The VMs 5508 comprise virtual processing, virtual memory, virtual networking or interface and virtual storage, and may be run by a corresponding virtualization layer 5506. Different embodiments of the instance of a virtual appliance 5502 may be implemented on one or more of VMs 5508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 5508 may be a software implementation of a physical machine that runs programs as if they were executing on a physical, non-virtualized machine. Each of the VMs 5508, and that part of hardware 5504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 5508 on top of the hardware 5504 and corresponds to the application 5502.

Hardware 5504 may be implemented in a standalone network node with generic or specific components. Hardware 5504 may implement some functions via virtualization. Alternatively, hardware 5504 may be part of a larger cluster of hardware (e.g., such as in a data center or CPE) where many hardware nodes work together and are managed via management and orchestration 5510, which, among others, oversees lifecycle management of applications 5502. In some embodiments, hardware 5504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 5512 which may alternatively be used for communication between hardware nodes and radio units.

Figure 15:
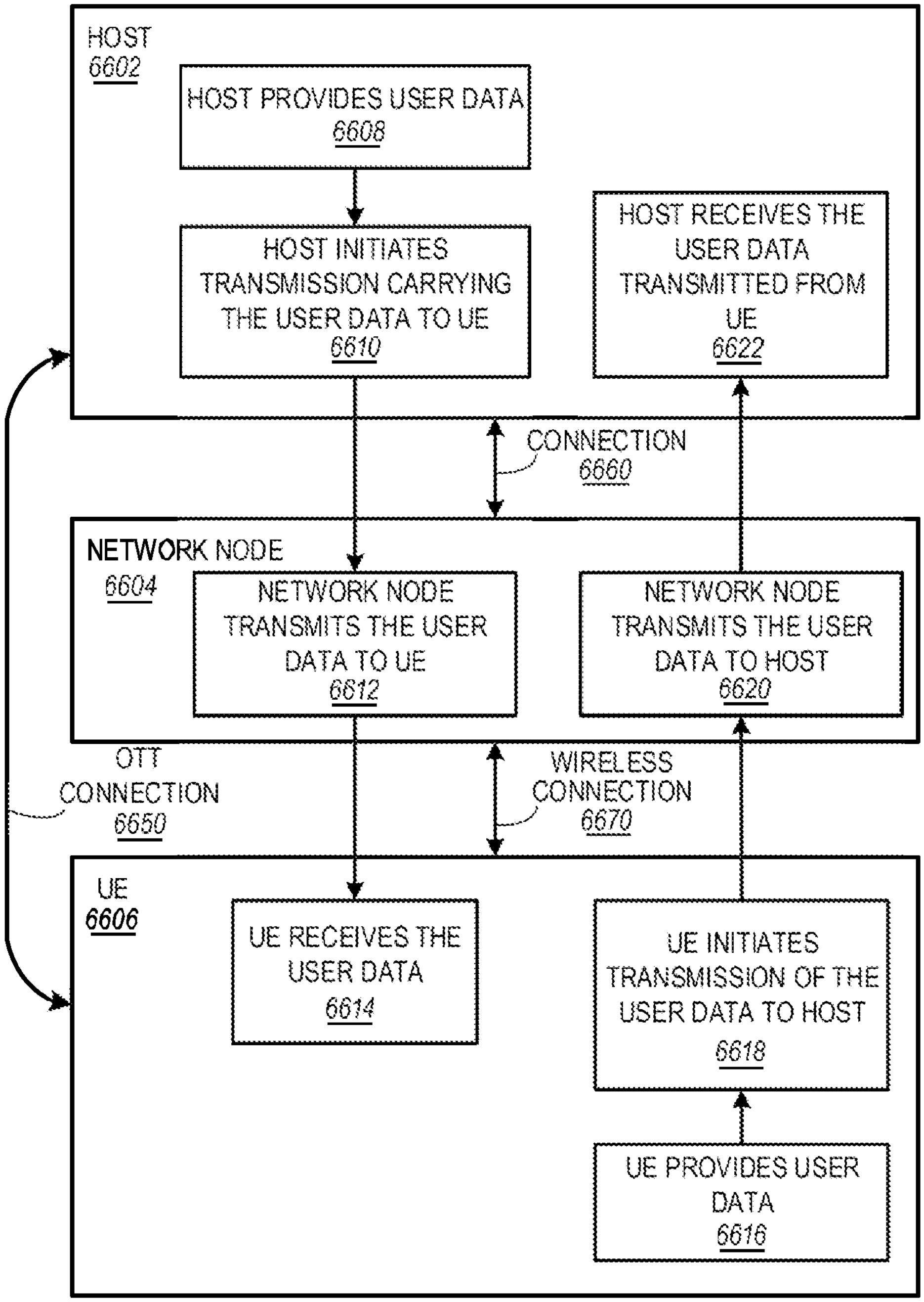
FIG. 15 shows a schematic representation of an embodiment of communication amongst nodes, hosts, and user equipment under the present disclosure.

FIG. 15 shows a communication diagram of a host 6602 communicating via a network node 6604 with a UE 6606 over a partially wireless connection in accordance with some embodiments. Example implementations, in accordance with various embodiments, of the UE (such as a UE 2112*a* of FIG. 10 and/or UE 2200 of FIG. 11), network node (such as network node 2110*a* of FIG. 10 and/or network node 3300 of FIG. 12), and host (such as host 2116 of FIG. 10 and/or host 4400 of FIG. 13) discussed in the preceding paragraphs will now be described with reference to FIG. 15.

Like host 4400, embodiments of host 6602 include hardware, such as a communication interface, processing circuitry, and memory. The host 6602 also includes software, which is stored in or accessible by the host 6602 and executable by the processing circuitry. The software includes a host application that may be operable to provide a service to a remote user, such as the UE 6606 connecting via an over-the-top (OTT) connection 6650 extending between the UE 6606 and host 6602. In providing the service to the remote user, a host application may provide user data which is transmitted using the OTT connection 6650.

The network node 6604 includes hardware enabling it to communicate with the host 6602 and UE 6606. The connection 6660 may be direct or pass through a core network (like core network 2106 of FIG. 10) and/or one or more other intermediate networks, such as one or more public, private, or hosted networks. For example, an intermediate network may be a backbone network or the Internet.

The UE 6606 includes hardware and software, which is stored in or accessible by UE 6606 and executable by the UE's processing circuitry. The software includes a client application, such as a web browser or operator-specific "app" that may be operable to provide a service to a human or non-human user via UE 6606 with the support of the host 6602. In the host 6602, an executing host application may communicate with the executing client application via the OTT connection 6650 terminating at the UE 6606 and host 6602. In providing the service to the user, the UE's client application may receive request data from the host's host application and provide user data in response to the request data. The OTT connection 6650 may transfer both the request data and the user data. The UE's client application may interact with the user to generate the user data that it provides to the host application through the OTT connection 6650.

The OTT connection 6650 may extend via a connection 6660 between the host 6602 and the network node 6604 and via a wireless connection 6670 between the network node 6604 and the UE 6606 to provide the connection between the host 6602 and the UE 6606. The connection 6660 and wireless connection 6670, over which the OTT connection 6650 may be provided, have been drawn abstractly to illustrate the communication between the host 6602 and the UE 1606 via the network node 6604, without explicit reference to any intermediary devices and the precise routing of messages via these devices.

As an example of transmitting data via the OTT connection 6650, in step 6608, the host 6602 provides user data, which may be performed by executing a host application. In some embodiments, the user data is associated with a particular human user interacting with the UE 6606. In other embodiments, the user data is associated with a UE 6606 that shares data with the host 6602 without explicit human interaction. In step 6610, the host 6602 initiates a transmission carrying the user data towards the UE 6606. The host 6602 may initiate the transmission responsive to a request transmitted by the UE 6606. The request may be caused by human interaction with the UE 6606 or by operation of the client application executing on the UE 6606. The transmission may pass via the network node 6604, in accordance with the teachings of the embodiments described throughout this disclosure. Accordingly, in step 6612, the network node 6604 transmits to the UE 6606 the user data that was carried in the transmission that the host 6602 initiated, in accordance with the teachings of the embodiments described throughout this disclosure. In step 6614, the UE 6606 receives the user data carried in the transmission, which may be performed by a client application executed on the UE 6606 associated with the host application executed by the host 6602.

In some examples, the UE 6606 executes a client application which provides user data to the host 6602. The user data may be provided in reaction or response to the data received from the host 6602. Accordingly, in step 6616, the UE 6606 may provide user data, which may be performed by executing the client application. In providing the user data, the client application may further consider user input received from the user via an input/output interface of the UE 6606. Regardless of the specific manner in which the user data was provided, the UE 6606 initiates, in step 6618, transmission of the user data towards the host 6602 via the network node 6604. In step 6620, in accordance with the teachings of the embodiments described throughout this disclosure, the network node 6604 receives user data from the UE 6606 and initiates transmission of the received user data towards the host 6602. In step 6622, the host 6602 receives the user data carried in the transmission initiated by the UE 6606.

One or more of the various embodiments improve the performance of OTT services provided to the UE 6606 using the OTT connection 6650, in which the wireless connection 6670 forms the last segment. More precisely, the teachings of these embodiments may improve the data rate, latency, and/or power consumption and thereby provide benefits such as reduced user waiting time, relaxed restriction on file size, improved content resolution, better responsiveness, and/or extended battery lifetime.

In an example scenario, factory status information may be collected and analyzed by the host 6602. As another example, the host 6602 may process audio and video data which may have been retrieved from a UE for use in creating maps. As another example, the host 6602 may collect and analyze real-time data to assist in controlling vehicle congestion (e.g., controlling traffic lights). As another example, the host 6602 may store surveillance video uploaded by a UE. As another example, the host 6602 may store or control access to media content such as video, audio, VR or AR which it can broadcast, multicast or unicast to UEs. As other examples, the host 6602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 6650 between the host 6602 and UE 6606, in response to variations in the measurement results. The measurement procedure and/or the network functionality for reconfiguring the OTT connection may be implemented in software and hardware of the host 6602 and/or UE 6606. In some embodiments, sensors (not shown) may be deployed in or in association with other devices through which the OTT connection 6650 passes; the sensors may participate in the measurement procedure by supplying values of the monitored quantities exemplified above, or supplying values of other physical quantities from which software may compute or estimate the monitored quantities. The reconfiguring of the OTT connection 6650 may include message format, retransmission settings, preferred routing etc.; the reconfiguring need not directly alter the operation of the network node 6604. Such procedures and functionalities may be known and practiced in the art. In certain embodiments, measurements may involve proprietary UE signaling that facilitates measurements of throughput, propagation times, latency and the like, by the host 6602. The measurements may be implemented in that software causes messages to be transmitted, in particular empty or 'dummy' messages, using the OTT connection 6650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by certain embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A method performed by a user equipment (UE) for obtaining a configuration for a machine learning (ML) model, the method comprising:

providing one or more indications of ML model support information to a network node that describes one or more ML models available at the UE, the one or more indications of ML model support information indicating at least one of: one or more model indicators; and one or more model version indicators; and obtaining a ML model identifier from the network node that identifies one of the one or more ML models available at the UE, wherein the ML model identifier comprises a long model identifier, the long model identifier configured to be unique for a same model type or model version over multiple sessions and for multiple UEs to allow consistent model identifier allocation over time and across the network.

2. The method of claim 1, further comprising performing the identified ML model.

3. The method of claim 1, wherein the ML model identifier further comprises a short model identifier, the short model identifier configured to be at least one of: unique for the UE for an identified ML model for at least a current session; a number of bits determined by the maximum number of concurrent configured models for the UE; or comprised of additional fields including at least one of a model type code and a version number.

4. The method of claim 1, wherein the long model identifier corresponds to a bit string of K bits, and the i-th part comprises K(i) bits so that K(1)+ . . . +K(N)=K, for N parts, and the K(i) number of bits may be the same or different for the different parts.

5. The method of claim 1, wherein the long model identifier contains at least one of: at least a portion of the one or more indications of ML model support information reported by the UE; network specific identification elements; or cell specific identification elements.

6. The method of claim 1, wherein obtaining the ML model identifier comprises receiving a version configuration based on the one or more model version indicators.

7. The method of claim 1, further comprising performing ML model handling-related signaling to and from the network using the ML model identifier to refer to the ML model available in the UE.

8. The method of claim 1, wherein the ML model identifier is shorter than at least one of: the one or more model indicators; and the one or more model version indicators.

9. The method of claim 1, wherein the ML model identifier comprises a numerical value or a character string.

10. The method of claim 1, wherein obtaining the ML model identifier from the network comprises receiving a version configuration based on the one or more version indicators.

11. The method of claim 1, wherein obtaining the ML model identifier from the network comprises at least one of: obtaining while the UE is in Radio Resource Control Connected state, RRC_CONNNECTED; obtaining when the UE enters RRC Idle state, RRC_IDLE; storing a short ML model identifier and its associated mapping when the UE enters RRC Inactive state, RRC_INACTIVE; restoring a short ML model identifier and its associated mapping when the UE initiates a RRC Resume procedure; or receiving a mapping in an RRC message.

12. The method of claim 11, wherein the RRC message comprises one of: RRC Reconfiguration; RRC Resume; or RRC Release.

13. The method of claim 1, wherein obtaining the ML model identifier from the network comprises;

receiving a first Radio Resource Control (RRC) message indicating addition of an ML model which has a first model identifier, wherein the message also indicates assignment of a second model identifier comprising a mapping of the first model identifier; and receiving a second RRC message indicating modification of the mapping or re-configuration of the ML model of the first model identifier, upon which the UE identifies the model of the first model identifier, by reception of the second model identifier.

14. The method of claim 1, wherein obtaining the ML model identifier from the network comprises;

receiving a first Radio Resource Control (RRC) message indicating addition of an ML model which has a first model identifier, wherein the message also indicates assignment of a second model identifier comprising a mapping of the first model identifier; and receiving a second RRC message indicating release of the mapping, upon which the UE releases an association between the first model identifier and the second model identifier.

15. A method performed by a network node for configuring a machine learning (ML) model in a user equipment (UE), the method comprising:

obtaining one or more indications of ML model support information from a UE that describe one or more ML models available at the UE, the one or more indications of ML model support information indicating at least one of: one or more model indicators; and one or more model version indicators;

determining a ML model identifier based at least in part on the one or more indications of ML model support information, the ML model identifier identifying one of the one or more ML models available at the UE, wherein the ML model identifier comprises a long model identifier, the long model identifier configured to be unique for a same model type or model version over multiple sessions and for multiple UEs to allow consistent model identifier allocation over time and across the network; and signaling the ML model identifier to the UE.

16. The method of claim 15, wherein signaling the ML model identifier comprises selecting a preferred ML model version based on the one or more version indicators and configuring the UE to use the preferred version.

17. The method of claim 15, further comprising performing ML model handling-related signaling to and from the UE using the ML model identifier to refer to the identified ML model.

18. The method of claim 15, wherein the ML model identifier is unique among a first set of ML model identifiers signaled to the UE at least for a current connection to the UE.

19. The method of claim 15, wherein the ML model identifier is shorter than the one or more model indicators and one or more model version indicators.

* * * * *